US 012478216B2

(12) United States Patent
Bigott et al.

(10) Patent No.: US 12,478,216 B2
(45) Date of Patent: Nov. 25, 2025

(54) FOOD HOLDING APPARATUS

(71) Applicant: Duke Manufacturing Co., St. Louis, MO (US)

(72) Inventors: James W. Bigott, Fenton, MO (US); Benjamin Kingbay Wann, St. Louis, MO (US); Thomas Earl Kieffer, St. Louis, MO (US); Jeffrey Allen Stafford, St. Louis, MO (US); Alan Stolzman, Robertsville, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 274 days.

(21) Appl. No.: 17/448,899

(22) Filed: Sep. 27, 2021

(65) Prior Publication Data

US 2022/0095836 A1  Mar. 31, 2022

Related U.S. Application Data

(60) Provisional application No. 63/083,534, filed on Sep. 25, 2020.

(51) Int. Cl.
*A47J 39/00* (2006.01)
*A47J 36/24* (2006.01)
*F25D 31/00* (2006.01)

(52) U.S. Cl.
CPC ......... *A47J 39/006* (2013.01); *A47J 36/2483* (2013.01); *F25D 31/005* (2013.01); *F25D 31/006* (2013.01)

(58) Field of Classification Search
CPC ... A47J 39/006; A47J 36/2483; F25D 31/005; F24D 31/006

USPC .......................................................... 99/336
See application file for complete search history.

(56) References Cited

U.S. PATENT DOCUMENTS

| | | | | |
|---|---|---|---|---|
| 1,281,027 | A | * 10/1918 | Kramer | F25D 19/02 62/499 |
| 2,182,153 | A | * 12/1939 | Kucher | F25B 49/02 62/526 |
| 2,250,612 | A | 7/1941 | Tanner | |
| 2,299,347 | A | 10/1942 | Rifkin | |
| 2,445,470 | A | 7/1948 | Brauer | |

(Continued)

FOREIGN PATENT DOCUMENTS

| | | |
|---|---|---|
| CN | 202567851 | 12/2012 |
| DE | 19757004 | 7/1999 |

(Continued)

OTHER PUBLICATIONS

JP20010190338 (Year: 2023).*

(Continued)

*Primary Examiner* — Steven W Crabb
(74) *Attorney, Agent, or Firm* — Stinson LLP

(57) ABSTRACT

A food holding apparatus and associated components and methods. The food holding apparatus includes multiple food receivers configured to be independently controlled to heat or cool food received therein. The food holding apparatus includes a refrigeration system. Components of the refrigeration system are mounted on a sled movable between stowed and access positions to facilitate access to the components. The food holding apparatus can include touch screen controls, serpentine-shaped bar heating elements, and/or other features.

22 Claims, 14 Drawing Sheets

(56) References Cited

U.S. PATENT DOCUMENTS

| | | | |
|---|---|---|---|
| 2,546,417 A | 3/1951 | Anglin | |
| 2,637,178 A * | 5/1953 | Galazzi | F25D 23/006 62/258 |
| 2,814,185 A | 11/1957 | Burg | |
| 3,113,314 A * | 12/1963 | Yetter | G01S 1/02 342/414 |
| 3,116,614 A * | 1/1964 | King | F25D 19/02 62/283 |
| 3,308,633 A | 3/1967 | Kritzer | |
| 3,516,485 A | 6/1970 | Rhoads et al. | |
| 3,780,794 A * | 12/1973 | Staub | A47F 3/04 219/400 |
| 3,797,563 A | 3/1974 | Hoffmann et al. | |
| 3,897,989 A | 8/1975 | Grandi | |
| 3,952,794 A | 4/1976 | Spanoudis | |
| 3,965,969 A | 6/1976 | Williamson | |
| 3,999,601 A | 12/1976 | Spanoudis | |
| 4,005,745 A | 2/1977 | Colato et al. | |
| 4,052,589 A | 10/1977 | Wyatt | |
| 4,126,775 A * | 11/1978 | Wyatt | A47B 31/02 219/400 |
| 4,203,486 A | 5/1980 | Rubbright et al. | |
| 4,235,285 A | 11/1980 | Johnson et al. | |
| D261,715 S | 11/1981 | Daenen | |
| 4,306,616 A | 12/1981 | Woods, Jr. et al. | |
| 4,343,985 A * | 8/1982 | Wilson | A47J 36/2488 219/214 |
| 4,593,752 A | 6/1986 | Tipton | |
| 4,685,311 A * | 8/1987 | Rastelli | A47J 27/14 62/255 |
| 4,856,579 A | 8/1989 | Wolfe | |
| 4,884,626 A | 12/1989 | Filipowski | |
| 4,898,091 A | 2/1990 | Rozak et al. | |
| 4,997,030 A | 3/1991 | Goto et al. | |
| 5,069,273 A | 12/1991 | O'Hearne | |
| 5,086,693 A | 2/1992 | Tippmann et al. | |
| 5,116,240 A | 5/1992 | Wischhusen et al. | |
| D340,617 S | 10/1993 | Douglas | |
| 5,363,672 A | 11/1994 | Moore et al. | |
| 5,388,429 A | 2/1995 | Shackelford et al. | |
| 5,404,935 A * | 4/1995 | Liebermann | A47J 39/006 165/918 |
| 5,423,449 A | 6/1995 | Gordon et al. | |
| 5,449,232 A | 9/1995 | Westbrooks, Jr. et al. | |
| 5,512,733 A | 4/1996 | Takikawa et al. | |
| 5,551,774 A | 9/1996 | Campbell et al. | |
| 5,598,886 A | 2/1997 | Criado-Mellado | |
| 5,655,595 A | 8/1997 | Westbrooks, Jr. | |
| 5,771,959 A | 6/1998 | Westbrooks, Jr. et al. | |
| 5,782,174 A | 7/1998 | Cohn et al. | |
| 5,895,104 A | 4/1999 | Grandi | |
| 5,901,699 A | 5/1999 | McDermott | |
| 5,910,210 A | 6/1999 | Violi et al. | |
| 5,927,092 A | 7/1999 | Kushen et al. | |
| 5,941,077 A | 8/1999 | Safyan | |
| 5,947,012 A | 9/1999 | Ewald et al. | |
| 5,954,984 A | 9/1999 | Ablah et al. | |
| 5,961,866 A | 10/1999 | Hansen | |
| 5,992,411 A | 11/1999 | Ayot et al. | |
| 6,034,355 A | 3/2000 | Naderi et al. | |
| 6,084,206 A | 7/2000 | Williamson et al. | |
| 6,145,333 A | 11/2000 | Richmond et al. | |
| 6,202,432 B1 | 3/2001 | Haasis | |
| 6,220,338 B1 | 4/2001 | Grandi | |
| 6,279,470 B2 | 8/2001 | Simeray et al. | |
| 6,315,039 B1 | 11/2001 | Westbrooks et al. | |
| 6,344,630 B1 | 2/2002 | Jarvis et al. | |
| 6,347,526 B1 * | 2/2002 | Ledbetter | F25D 23/003 165/48.1 |
| 6,385,990 B1 | 5/2002 | Lee | |
| 6,434,961 B2 | 8/2002 | Richmond et al. | |
| 6,447,827 B1 | 9/2002 | Andersen | |
| 6,539,846 B2 | 4/2003 | Citterio et al. | |
| 6,561,317 B1 | 5/2003 | Dudley | |
| 6,606,832 B2 | 8/2003 | Richardson et al. | |
| 6,658,857 B1 | 12/2003 | George | |
| 6,672,092 B2 | 1/2004 | Ruiz et al. | |
| 6,735,971 B2 | 5/2004 | Monroe et al. | |
| 6,774,346 B2 | 8/2004 | Clothier | |
| 6,802,367 B1 * | 10/2004 | Westbrooks, Jr. | F25D 31/005 165/918 |
| 6,817,201 B2 | 11/2004 | Yingst | |
| 6,910,347 B2 | 6/2005 | Monroe et al. | |
| 7,028,498 B2 | 4/2006 | Monroe et al. | |
| 7,105,779 B2 | 9/2006 | Shei | |
| 7,227,102 B2 | 6/2007 | Shei | |
| RE40,151 E | 3/2008 | Shei et al. | |
| D578,352 S | 10/2008 | Hauser | |
| D601,382 S | 10/2009 | Ishida | |
| 8,104,852 B2 | 1/2012 | Oh et al. | |
| 8,171,845 B2 | 5/2012 | Hartsfield, Jr. et al. | |
| 8,307,761 B1 * | 11/2012 | Shackelford | A47F 3/0486 426/520 |
| 8,378,265 B2 | 2/2013 | Greenwood et al. | |
| D687,268 S | 8/2013 | Difante | |
| 8,661,970 B2 | 3/2014 | Shackelford | |
| 8,997,640 B2 | 4/2015 | Hartsfield, Jr. et al. | |
| 9,016,192 B2 * | 4/2015 | Frauenfeld | A47F 10/06 219/451.1 |
| 9,089,210 B2 | 7/2015 | Kool | |
| D767,940 S | 10/2016 | Gross et al. | |
| D774,831 S | 12/2016 | Gebhardt et al. | |
| 9,688,179 B2 | 6/2017 | White et al. | |
| 9,795,253 B2 | 10/2017 | Shackelford | |
| 9,962,037 B2 | 5/2018 | Magner | |
| D871,155 S | 12/2019 | Miller et al. | |
| D909,114 S | 2/2021 | Liao | |
| D932,231 S | 10/2021 | Humphreys et al. | |
| D960,649 S | 8/2022 | Ghiorghie | |
| D961,333 S | 8/2022 | Zhong | |
| 2002/0134545 A1 | 9/2002 | Cho et al. | |
| 2002/0179131 A1 | 12/2002 | Johnson et al. | |
| 2003/0080657 A1 | 5/2003 | Koopman | |
| 2003/0108647 A1 | 6/2003 | Grandi | |
| 2003/0154733 A1 | 8/2003 | Ruiz et al. | |
| 2004/0020915 A1 | 2/2004 | Shei | |
| 2004/0069766 A1 | 4/2004 | Haasis et al. | |
| 2004/0237959 A1 | 12/2004 | Ashley | |
| 2005/0023462 A1 | 2/2005 | Rosenman et al. | |
| 2005/0217298 A1 | 10/2005 | Monroe et al. | |
| 2005/0255208 A1 | 11/2005 | Shei | |
| 2006/0081627 A1 | 4/2006 | Shei et al. | |
| 2006/0162908 A1 | 7/2006 | Tippmann | |
| 2006/0201177 A1 | 9/2006 | Spillner | |
| 2007/0210055 A1 | 9/2007 | Konrad | |
| 2008/0025462 A1 | 1/2008 | Shei et al. | |
| 2008/0185390 A1 | 8/2008 | Liebzeit | |
| 2008/0283440 A1 | 11/2008 | Hartsfield, Jr. et al. | |
| 2010/0293979 A1 | 11/2010 | Shei et al. | |
| 2010/0301034 A1 | 12/2010 | Greenwood et al. | |
| 2011/0277644 A1 | 11/2011 | Frauenfeld et al. | |
| 2013/0037237 A1 | 2/2013 | Shackelford | |
| 2014/0131006 A1 | 5/2014 | Shackelford | |
| 2015/0068038 A1 * | 3/2015 | Iovanel | F25B 1/10 29/890.035 |
| 2015/0136633 A1 * | 5/2015 | Sarnoff | A47J 36/2405 206/499 |
| 2015/0173526 A1 * | 6/2015 | Delgadillo | F25D 23/061 62/99 |
| 2017/0079476 A1 * | 3/2017 | Fortmann | A47J 39/006 |
| 2017/0082354 A1 | 3/2017 | Lintker et al. | |
| 2017/0328958 A1 | 11/2017 | Bohn et al. | |
| 2018/0014635 A1 | 1/2018 | Turner et al. | |
| 2018/0160854 A1 | 6/2018 | Jennings et al. | |
| 2018/0299024 A1 | 10/2018 | Matsuzaki et al. | |
| 2018/0299192 A1 | 10/2018 | Clark et al. | |
| 2018/0333006 A1 * | 11/2018 | Bassill | A47J 36/2483 |
| 2019/0075970 A1 * | 3/2019 | Patterson | A47F 10/06 |
| 2019/0254453 A1 * | 8/2019 | Höller | A47F 3/0486 |
| 2019/0290073 A1 | 9/2019 | Veltrop | |
| 2020/0046170 A1 | 2/2020 | Veltrop | |
| 2021/0348836 A1 | 11/2021 | Lauchnor | |
| 2022/0095837 A1 * | 3/2022 | Bigott | A47F 3/001 |

(56) References Cited

U.S. PATENT DOCUMENTS

| | | | |
|---|---|---|---|
| 2022/0233023 A1 | 7/2022 | Stettes et al. | |
| 2022/0234785 A1 | 7/2022 | Subramani | |
| 2023/0000246 A1 | 1/2023 | Boudreault | |
| 2023/0007803 A1 | 1/2023 | Song et al. | |

FOREIGN PATENT DOCUMENTS

| | | | |
|---|---|---|---|
| DE | 10061201 | | 6/2002 |
| EP | 3795042 | * | 3/2021 |
| FR | 2605395 | | 4/1988 |
| FR | 2759890 | | 8/1998 |
| JP | 2001190338 A | | 7/2001 |
| JP | 2003070575 | | 3/2003 |
| JP | 2003336956 | * | 11/2003 |
| JP | 2008025920 | | 2/2008 |
| JP | 2010236808 A | | 10/2010 |
| KR | 20050026599 | | 3/2005 |
| KR | 20050031783 | | 4/2005 |
| KR | 20050026600 | | 3/2015 |
| WO | WO199416607 | | 8/1994 |
| WO | WO199733130 | | 9/1997 |
| WO | WO199837797 | | 9/1998 |
| WO | WO199853260 | | 11/1998 |
| WO | WO200071950 | | 11/2000 |
| WO | WO2003034882 | | 5/2003 |
| WO | WO2006087012 | | 8/2006 |
| WO | WO2007063294 | | 6/2007 |
| WO | 2008/021492 A3 | | 2/2008 |
| WO | WO2008127330 | | 10/2008 |
| WO | WO2010151456 | | 12/2010 |

OTHER PUBLICATIONS

JP2008029365 (Year: 2023).*
JP3776274 (Year: 2023).*
JP4762814 (Year: 2023).*
JP2003336956 (Year: 2023).*
WO00/71950 (Year: 2023).*
WO2010133504 (Year: 2023).*
FR2652885 (Year: 2023).*
CN111059851 (Year: 2023).*
WO2022/263840 (Year: 2023).*
JP2002517265 (Year: 2023).*
JP20033369 (Year: 2023).*
JPH546863 (Year: 2023).*
JP2003336956 (Year: 2024).*
Low Temp. Industries Demonstrative Exhibits for the IPRs Re. U.S. Pat. Nos. 8,307,761, 8,661,970, and 9,795,253, Apr. 7, 2022, 61 pages.
American National Standard/NSF International Standard, "Commercial refrigerators and freezers," Commercial Refrigerator Manufacturers Association, NSF/ANSI 7—2007, 48 pages.
Delfield, "FlexiWell—Mobile hot and cold combination serving counters," Welbilt, 4 pages.
Duke Manufacturing Co. Specifications, "ADI-2-6HC Drop in Hot and Cold Pan," F.O.B. Sedalia, Missouri, 2 pages.
Duke Manufacturing Co. Specifications, "Aerohot Foodservice—Hot Food Units—Electric—Sealed Wells," Catalog No. AFS-Elecsw, A.I.A. File No. 35-C-13, F.O.B Sedalia, Missouri, 2 pages.
Duke Manufacturing Co. Specifications, "Aeroserv—Serving Systems—Hot Food Units—Electric," Catalog No. ASC-Elechot, A.I.A. File No. 35-C-13, F.O.B Sedalia, Missouri, 2 pages.
Duke Manufacturing Co. Specifications, "Aeroserv—Serving Systems—Hot Food Units—Gas," Catalog No. ASC-Gashot, A.I.A. File No. 35-C-13, F.O.B Sedalia, Missouri, 2 pages.
Duke Manufacturing Co. Specifications, "Drop-in—Hot Food—Electric Sealed Well," Catalog No. ADI-Elechfsw, A.I.A. File No. 35-C-13, F.O.B Sedalia, Missouri, 2 pages.
Duke Manufacturing Co. Specifications, "Thurmaduke™ Steamtables—Hot Food—Electric—Standard," Catalog No. TST-Stelechot, A.I.A. File No. 35-C-13, F.O.B Sedalia, Missouri, 2 pages.
Food Safety, "It's Everyone's Business," County of Santa Clara, Department of Environmental Health, Consumer Protection Division, 5th Edition, dated Jul. 2008, 55 pages.
G.A. Systems, Inc., "Hot Cold Dual Operation Drop in," Specification Sheet, 2 pages.
Low Temp Industries, "QuickSwitch Series—Drop in CHP-X Units," Operation/Maintenance Manual, Custom Fabricators of Foodservice Equipment, Jonesboro, GA, 26 pages.
Rhode Island Department of Health, "Potentially Hazardous Food Temperatures," Office of Food Protection, revision dated Nov. 2207, URL: <www.health.ri.gov>.
State of Connecticut: Department of Public Health, "Compliance Guide for the Food Service Inspection Form," Bureau of Regulatory Services, Division of Environmental Health, Food Protection Program, Hartford, CT, revision dated Dec. 2007, 45 pages.
Strollerderby, "From Ice Box to Sub-Zero: The Evolution of the Kitchen From 1900-2012 (Photos)," available on or before Nov. 16, 2012, via Internet Archive: Wayback Machine URL <https://web.archive.org/web/20121116004949/http://blogs.babble.com/strollerderby/2012/11/12/from-ice-box-to-sub-zero-the-evolution-of-the-kitchen-from-1900-2012-photos/#close>, retrieved on Nov. 22, 2021, 6 pages.
The Vollrath Company LLC, "1 Well, 2 Well, 3 Well, and 4 Well Hot/Cold Drop-in (NSF7 Cold Food Holding and NSF4 Hot Food Holding)," Operator's Manual for Item No. 2350245-1, dated Apr. 29, 2015, 5 pages.
The Vollrath Company LLC, "Hot/Cold Well Modular Drop-ins (NSF7 Cold Food Holding and NSF4 Hot Food Holding)," Operations Manual for Part No. 351818-1, dated Jan. 30, 2019, 12 pages.
2003 Flyer—Food Facilities Concepts, Inc., Preliminary Design Study, Cafeteria Renovation.
Atlas Metal Industries, Inc., Mobile Cold Serving Unit, Model No. BLC-4-RM, Oct. 2004, 2 Pgs.
Atlas Metal Industries, Inc., Mobile Hot Serving Unit, Model No. BLH-4, Mar. 2001, 2 Pgs.
Barker Sales, QCF Series—Self-Service Drop-in Merchandiser, Model Nos. QCF-3, -4, -5, -6, and -8, May 2007, 2 Pgs.
Corrected IPR Petition Against U.S. Pat. No. 8,701,554.
Declaration of Dr. J. Rhett Mayor in Support of Preliminary Injunction Re. U.S. Pat. Nos. 8,307,761, 8,661,970, and 9,795,253.
Defendant Commercial Kitchens, Inc. Original Answer, Affirmative Defenses, and Counterclaim to Complaint Re. Infringement of U.S. Pat. No. 8,701,554.
Delfield Co. Answer to Complaint and Counterclaim Re. Infringement of U.S. Pat. No. 8,997,640.
Deposition of J. Rhett Mayor Duke Manufacturing Co. Corrected Opening Brief on Appeal Re. U.S. Pat. Nos. 8,307,761, 8,661,970, and 9,795,253.
Duke Manufacturing Co. Corrected Opening Brief on Appeal Re. U.S. Pat. Nos. 8,307,761, 8,661,970, and 9,795,253.
Duke Manufacturing Co. Demonstrative Exhibits for the IPRs Re. U.S. Pat. Nos. 8,307,761, 8,661,970, and 9,795,253.
Duke Manufacturing Co. Demonstrative Exhibits in the IPRs Re. U.S. Pat. Nos. 8,307,761, 8,661,970, and 9,795,253.
Duke Manufacturing Co. Memorandum in Support of its Motion for Partial Summary Judgment Re. U.S. Pat. Nos. 8,307,761, 8,661,970, and 9,795,253.
Duke Manufacturing Co. Memorandum Re. its Motion to Amend its Preliminary Invalidity Contentions Re. U.S. Pat. Nos. 8,307,761, 8,661,970, and 9,795,25.
Duke Manufacturing Co. Motion for Partial Summary Judgment Re. U.S. Pat. Nos. 8,307,761, 8,661,970, and 9,795,253.
Duke Manufacturing Co. Preliminary Reply in the IPR Re. U.S. Pat. No. 8,307,761.
Duke Manufacturing Co. Preliminary Reply in the IPR Re. U.S. Pat. No. 8,661,970.
Duke Manufacturing Co. Preliminary Reply in the IPR Re. U.S. Pat. No. 9,795,253.
Duke Manufacturing Co. Reply Brief on Appeal Re. U.S. Pat. Nos. 8,307,761, 8,661,970, and 9,795,253.
Duke Manufacturing Co. Reply in Support of its Motion for Partial Summary Judgment Re. U.S. Pat. Nos. 8,307,761, 8,661,970, and 9,795,253.

(56) References Cited

OTHER PUBLICATIONS

Duke Manufacturing Co. Reply in the IPR Re. U.S. Pat. No. 8,307,761.
Duke Manufacturing Co. Reply in the IPR Re. U.S. Pat. No. 8,661,970.
Duke Manufacturing Co. Reply in the IPR Re. U.S. Pat. No. 9,795,253.
Duke Manufacturing Co. Stipulation of Invalidity Contentions Re. U.S. Pat. Nos. 8,307,761, 8,661,970, and 9,795,253.
Duke Manufacturing Co. Sur Reply in Opposition to Preliminary Injunction Re. U.S. Pat. Nos. 8,307,761, 8,661,970, and 9,795,253.
Duke Mfg. Co., 2006 Standard Products Price Book, 2 Pgs. Including Cover Page and p. 115 Admitted Prior Art.
Expert Declaration of Dr. J. Rhett Mayor Re. the Validity of U.S. Pat. Nos. 8,307,761, 8,661,970, and 9,795,253.
Expert Declaration of J. Rhett Mayor Re. Validity of U.S. Pat. No. 8,307,761.
Expert Declaration of J. Rhett Mayor Re. Validity of U.S. Pat. No. 8,661,970.
Expert Declaration of J. Rhett Mayor Re. Validity of U.S. Pat. No. 9,795,253.
Expert Declaration of Kelly Homan Re. Invalidity of U.S. Pat. No. 8,307,761.
Expert Declaration of Kelly Homan Re. Invalidity of U.S. Pat. No. 8,661,970.
Expert Declaration of Kelly Homan Re. Invalidity of U.S. Pat. No. 9,795,253.
Expert Declaration of Kelly Homan Re. Invalidity of U.S. Pat. Nos. 8,307,761, 8,661,970, and 9,795,253.
Expert Report of Dr. J. Rhett Mayor Re. U.S. Pat. Nos. 8,307,761, 8,661,970, and 9,795,253.
Expert Report of Kelly Homan Re. the Invalidity of U.S. Pat. No. 8,307,761.
Expunged Corrected Inter Partes Review Petition Against U.S. Pat. No. 8,701,554.
Feb. 16, 2022 Deposition of Kelly Homan.
Federal Circuit Decision Reversing the Preliminary Injunction Re. U.S. Pat. Nos. 8,307,761, 8,661,970, and 9,795,253.
Final Written Decision in the IPR Re. U.S. Pat. No. 8,307,761.
Final Written Decision in the IPR Re. U.S. Pat. No. 8,661,970.
Final Written Decision in the IPR Re. U.S. Pat. No. 9,795,253.
Flexible Heaters.
Flyer 1 Complete, Bring Your Lunchroom to Life, 2002-2003, 8 Pgs.
Flyer 2 Complete, Bring Your Lunchroom to Life, 2003-2004, 8 Pgs.
Hatco Corporation, Glo-Ray Designer Merchandising Warmers, Model Nos. GR2SDH and GR2SDS, Undated, 2 Pgs.
Hatco Corporation, Glo-Ray Pizza Warmers, Model Nos. GRPWS Series, 2 Pgs.
Hatco Glo-Ray Operator's Manual (2012).
How a Silicone Heating Pad Works.
Institution Decision in the IPR Re. U.S. Pat. No. 8,307,761.
Institution Decision in the IPR Re. U.S. Pat. No. 8,661,970.
Institution Decision in the IPR Re. U.S. Pat. No. 9,795,253.
Inter Partes Review Petition Against U.S. Pat. No. 8,307,761.
Inter Partes Review Petition Against U.S. Pat. No. 8,661,970.
Inter Partes Review Petition Against U.S. Pat. No. 9,795,253.
Invalidity Contentions for U.S. Pat. No. 8,307,761 - Part 1.
Invalidity Contentions for U.S. Pat. No. 8,307,761 based on Duke Heritage Buffet.
Invalidity Contentions for U.S. Pat. No. 8,307,761 based on Finegan.
Invalidity Contentions for U.S. Pat. No. 8,307,761 based on Load King Diamond Bar.
Invalidity Contentions for U.S. Pat. No. 8,307,761 based on Richmond.
Invalidity Contentions for U.S. Pat. No. 8,307,761 based on Shackelford.
Invalidity Contentions for U.S. Pat. No. 8,661,970 based on Duke Heritage Buffet.
Invalidity Contentions for U.S. Pat. No. 8,661,970 based on Finegan.
Invalidity Contentions for U.S. Pat. No. 8,661,970 based on Load King Diamond Bar.
Invalidity Contentions for U.S. Pat. No. 8,661,970 based on Richmond.
Invalidity Contentions for U.S. Pat. No. 8,661,970 based on Shackelford.
Invalidity Contentions for U.S. Pat. No. 9,795,253 based on Duke Heritage Buffet.
Invalidity Contentions for U.S. Pat. No. 9,795,253 based on Finegan.
Invalidity Contentions for U.S. Pat. No. 9,795,253 based on Load King Diamond Bar.
Invalidity Contentions for U.S. Pat. No. 9,795,253 based on Richmond.
Invalidity Contentions for U.S. Pat. No. 9,795,253 based on Shackelford.
Invalidity Contentions for U.S. Pat. No. 8,307,761—Part 2.
Jul. 8, 2021 Deposition of Dennis Finegan.
Jun. 25, 2021 Deposition of Alvis Hartsfield.
Kitchen Equipment Fabricating Co. Answer to Counterclaim Re. Infringement of U.S. Pat. No. 8,701,554.
Low Temp Indus. Corrected Responsive Brief on Appeal Re. U.S. Pat. Nos. 8,307,761, 8,661,970, and 9,795,253.
Low Temp Indus. Preliminary Response in the IPR Re. U.S. Pat. No. 8,661,970.
Low Temp Indus. Preliminary Response in the IPR Re. U.S. Pat. No. 9,795,253.
Low Temp Indus. Preliminary Response in the IPR Re. U.S. Pat. No. 8,307,761.
Low Temp Indus. Preliminary Sur Reply in the IPR Re. U.S. Pat. No. 8,307,761.
Low Temp Indus. Preliminary Sur Reply in the IPR Re. U.S. Pat. No. 8,661,970.
Low Temp Indus. Preliminary Sur Reply in the IPR Re. U.S. Pat. No. 9,795,253.
Low Temp Indus. Response for Preliminary Injunction Re. U.S. Pat. Nos. 8,307,761, 8,661,970, and 9,795,253.
Low Temp Indus. Response in the IPR Re. U.S. Pat. No. 8,307,761.
Low Temp Indus. Response in the IPR Re. U.S. Pat. No. 8,661,970.
Low Temp Indus. Response in the IPR Re. U.S. Pat. No. 9,795,253.
Low Temp Indus. Sur Reply in the IPR Re. U.S. Pat. No. 8,307,761.
Low Temp Indus. Sur Reply in the IPR Re. U.S. Pat. No. 8,661,970.
Low Temp Indus. Sur Reply in the IPR Re. U.S. Pat. No. 9,795,253.
Low Temp. Industries Reply in Support of its Motion for Preliminary Injunction Re. U.S. Pat. Nos. 8,307,761, 8,661,970, and 9,795,253.
Mar. 23, 2021 Deposition of Kelly Homan.
Oct. 1, 2021 Deposition of Kelly Homan.
Order Granting Motion for Preliminary Injunction Re. U.S. Pat. Nos. 8,307,761, 8,661,970, and 9,795,253.
Original Inter Partes Review Petition Against U.S. Pat. No. 8,701,554.
Preliminary Injunction Hearing Transcript.
Prosecution History of U.S. Pat. No. 8,171,845.
Prosecution History of U.S. Pat. No. 8,701,554.
Prosecution History of U.S. Pat. No. 8,997,640.
Rebuttal Report of Dr. J. Rhett Mayor Re. Validity of U.S. Pat. Nos. 8,307,761, 8,661,970, and 9,795,253.
Second Declaration of Dr. J. Rhett Mayor in Support of Preliminary Injunction Re. U.S. Pat. Nos. 8,307,761, 8,661,970, and 9,795,253.
Second Expert Declaration of Kelly Homan Re. Invalidity of U.S. Pat. No. 8,307,761.
Second Expert Declaration of Kelly Homan Re. Invalidity of U.S. Pat. No. 8,661,970.
Second Expert Declaration of Kelly Homan Re. Invalidity of U.S. Pat. No. 9,795,253.
Supplemental Expert Declaration of Kelly Homan Re. Invalidity of U.S. Pat. Nos. 8,307,761, 8,661,970, and 9,795,253.
Supplemental Declaration of Kelly Homan in Opposition of Preliminary Injunction Re. U.S. Pat. Nos. 8,307,761, 8,661,970, and 9,795,253.
The Delfield Company, F5 Serview Drop IN-30 Deep Mirrored Self-Contained Refrigerated Display Cases.
The Delfield Company, Mobile Ice Pan Serving Counters, Shelleyglas, Model KCI and KCI-NU, May 2007.
Third Declaration of Dr. J. Rhett Mayor in Support of Preliminary Injunction Re. U.S. Pat. Nos. 8,307,761, 8,661,970, and 9,795,253.

(56) References Cited

OTHER PUBLICATIONS

Wayback Machine Describing Glo-Ray Headed Shelves, Apr. 10, 2004, 2 Pgs.
Duke Manufacturing Co. Hot-Cold Convertible Unit Drop In.
Duke Manufacturing Co. HB3-1H2C Heritage Buffet—Hot-Cold Cold Pan.
Duke Manufacturing Co. E303SW Aerohot Foodservice Hot Food Units—Electric—Sealed Wells.
Duke Manufacturing Co. E303-25 AeroServ Serving Systems—Hot Food Units—Electric.
Duke Manufacturing Co. E-3-CBSS Thurmaduke Steamtables Hot Food Units—Electric—Standard.
Duke Manufacturing Co. Drop Ins.
Duke Manufacturing Co. ADI-3E-SW Hot Food Electric—Sealed Well—Drop In.
Manufacturing Co. 304-25PG AeroServ Serving Systems—Hot Food Units—Gas.
Manufacturing Co. 212-ADI3HC Hot-Cold Convertible Unit Drop In.
Declaration of James Bigott Re. Commercial Product Embodied by U.S. Pat. Nos. 8,307,761, 8,661,970, and 9,795,253.

\* cited by examiner

FOOD HOLDING APPARATUS

CROSS-REFERENCE TO RELATED APPLICATION

The present application claims priority to U.S. Provisional Application No. 63/083,534, filed on Sep. 25, 2020, the entirety of which is incorporated by reference.

FIELD

The present disclosure generally relates to food holding apparatus and more particularly to apparatus for holding food at hot and/or cold temperatures.

BACKGROUND

Food holding apparatus, such as countertop food holding apparatus, are commonly used in restaurants and kitchens, such as part of a buffet or serving line, to hold prepared food at a set temperature before the food is served to a consumer.

SUMMARY

In one aspect, a food holding apparatus comprises a housing including an upper portion having at least three food receivers arranged in a row. Each food receiver defines a cavity with an open top. The cavity is sized and shaped to receive a tray of food when the tray of food is inserted into the cavity from the open top. Each food receiver has a cooling conduit configured to receive refrigerant to cool the tray of food when the tray of food is disposed in the cavity. Each food receiver has a heating element configured to heat the tray of food when the tray of food is disposed in the cavity. The housing defines an interior. A sled is supported by the housing. The sled is slideable relative to the housing between a stored position and an access position. The sled is configured to be disposed in the interior when the sled is in the stored position and to be disposed at least partially outside the interior when the sled is in the access position. A refrigeration system is fluidly coupled to the cooling conduit of each food receiver to supply the cooling conduit with the refrigerant. The refrigeration system includes a compressor mounted on the sled and movable with the sled between the stored position and the access position. The refrigeration system includes a condenser mounted on the sled and movable with the sled between the stored position and the access position. Plumbing fluidly connects the compressor, the condenser, and the cooling conduit. The plumbing includes a first coiled flexible pipe fluidly coupled between the compressor and the cooling conduit to permit flow of refrigerant through the first coiled flexible pipe from the cooling conduit to the compressor. The plumbing includes a second coiled flexible pipe fluidly coupled between the condenser and the cooling conduit to permit flow of refrigerant through the second coiled flexible pipe from the condenser to the cooling conduit. The first and second coiled flexible pipes are configured to expand as the sled is moved from the stored position toward the access position and configured to contract as the sled is moved from the access position toward the stored position. A food holding apparatus temperature control system includes at least one tangible storage medium, at least one user interface, and at least one temperature sensor. The food holding apparatus temperature control system is communicatively coupled to the refrigeration system and to the heating element of each food receiver. The food holding apparatus temperature control system is responsive to instructions stored in the at least one tangible storage medium to control a temperature of each food receiver. The food holding apparatus temperature control system being responsive to instructions stored in the at least one tangible storage medium and to user input from the at least one user interface to control the refrigeration system and the heating elements to switch each food receiver between heating and cooling independently with respect to other food receivers of the at least three food receivers.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
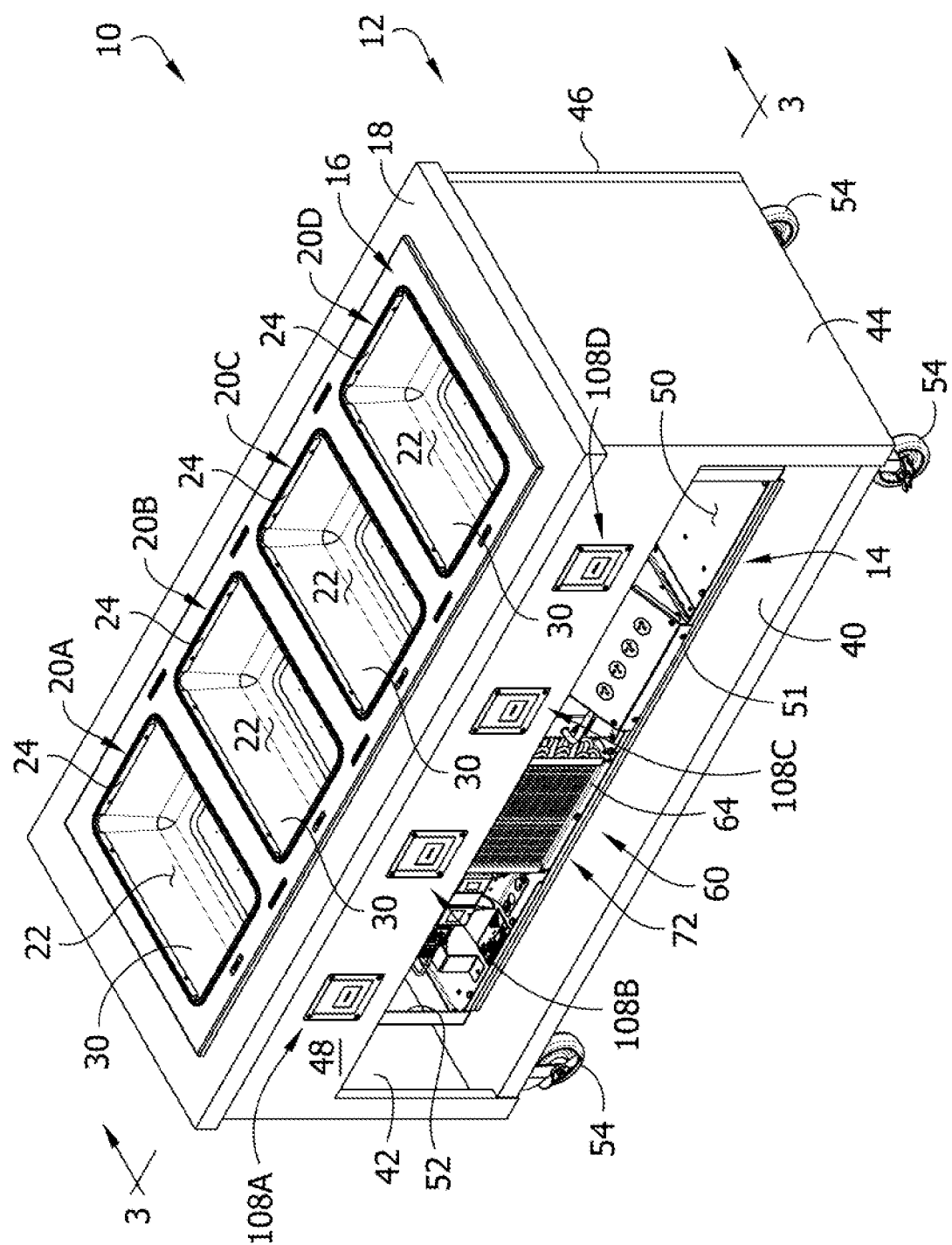
FIG. 1 is a perspective of a food holding apparatus according to one embodiment of the present disclosure, with a support in the stored position.

Referring to the drawings, FIG. 1 illustrates one embodiment of food holding apparatus according to the present disclosure, indicated generally at reference numeral 10. The food holding apparatus 10 may be used to hold trays of prepared or ready to serve food at set temperatures. As will become apparent, the food holding apparatus can heat and/or cool multiple different trays of food at the same time.

Referring to FIGS. 1-5, the food holding apparatus 10 may include a cabinet or food bar, generally indicated by reference numeral 12. The food holding apparatus 10 includes a housing or framework 14 with a counter or upper portion 16. The upper portion 16 is configured to receive and hold one or more trays of food (not shown). The cabinet 12 defines or includes a food serving countertop 18 from which food from the one or more trays may be served, with the upper portion 16 of the housing 14 generally disposed at the countertop.

In one embodiment, the housing 14 (and associated components supported thereby) may be a self-contained unit (e.g., "drop-in") that is dropped into the cabinet 12 and supported by the cabinet. The upper portion 16 of the housing 14 may include one or more bendable wings that are configured to be bent upward after the housing 14 is dropped into the cabinet 12 to underlie the countertop 18. The bendable wings may include fastener openings through which fasteners are inserted through and into the underside of the countertop 18 to secure the housing 14 to the cabinet 12. The one or more bendable wings may extend generally along the perimeter of the upper portion 16.

The upper portion 16 includes one or more receivers 20 (broadly, "food receiver") configured to receive the trays of food. In the illustrated embodiment, the food holding apparatus 10 includes four food receivers 20, however more or fewer receivers are within the scope of the present disclosure. For example, the food holding apparatus 10 can include one, two, three, four, five or more food receivers 20. Each receiver 20 defines a cavity 22 with an open top 24. The open top 24 is adjacent to or at (e.g., generally co-planar with) the food serving countertop 18. Each cavity 22 is sized and shaped to receive and hold one or more trays of food. Each tray of food is inserted into the cavity 22 from the open top 24.

Each tray receiver 20 is able to cool the tray of food and/or keep the tray of food at a cool temperature (e.g., a temperature below room temperature). Each tray receiver 20 includes a cooling element for cooling the receiver. In the illustrated embodiment, the cooling element comprises a cooling coil 26 (e.g., cooling conduit such as a copper tube) configured to receive refrigerant to cool the tray of food when the tray of food is disposed in the cavity 22. The cooling coil 26 wraps around the cavity 22 (e.g., three or more times around the cavity 22). In the illustrated embodiment, each receiver 20 is doubled walled, with insulation 28 disposed between the walls.

The receiver 20 includes a pan 30 (e.g., a lower or bottom wall, first and second side walls, and first and second end walls) and an outer housing 32 (e.g., including a lower or bottom wall, an upper wall, first and second side walls, and first and second end walls). The pan 30 defines the cavity 22. The insulation 28 is disposed between the pan 30 and outer housing 32. The insulation 28 is disposed along the sides, ends and bottom of the pan 30. The lower wall of the pan 30 defines the bottom of the cavity 22, the side walls define the sides of the cavity and the end walls define the ends of the cavity.

Each cooling coil 26 is disposed between the inner walls and outer walls. Desirably, each cooling coil 26 is surrounded or engulfed in a thermal mastic to enhance the thermal conductivity between the cooling coil and the cavity 22. By engulfing the cooling coil 26 in a thermal mastic, the total surface area of the cooling coil in thermal contact with the pan 30 is increased over conventional arrangements, which generally rely on one point of contact (tangent contact) between a circular pipe and the planar surface the circular pipe extends along. The insulation 28 surrounds the cooling coil 26 and thermal mastic.

Figure 2:
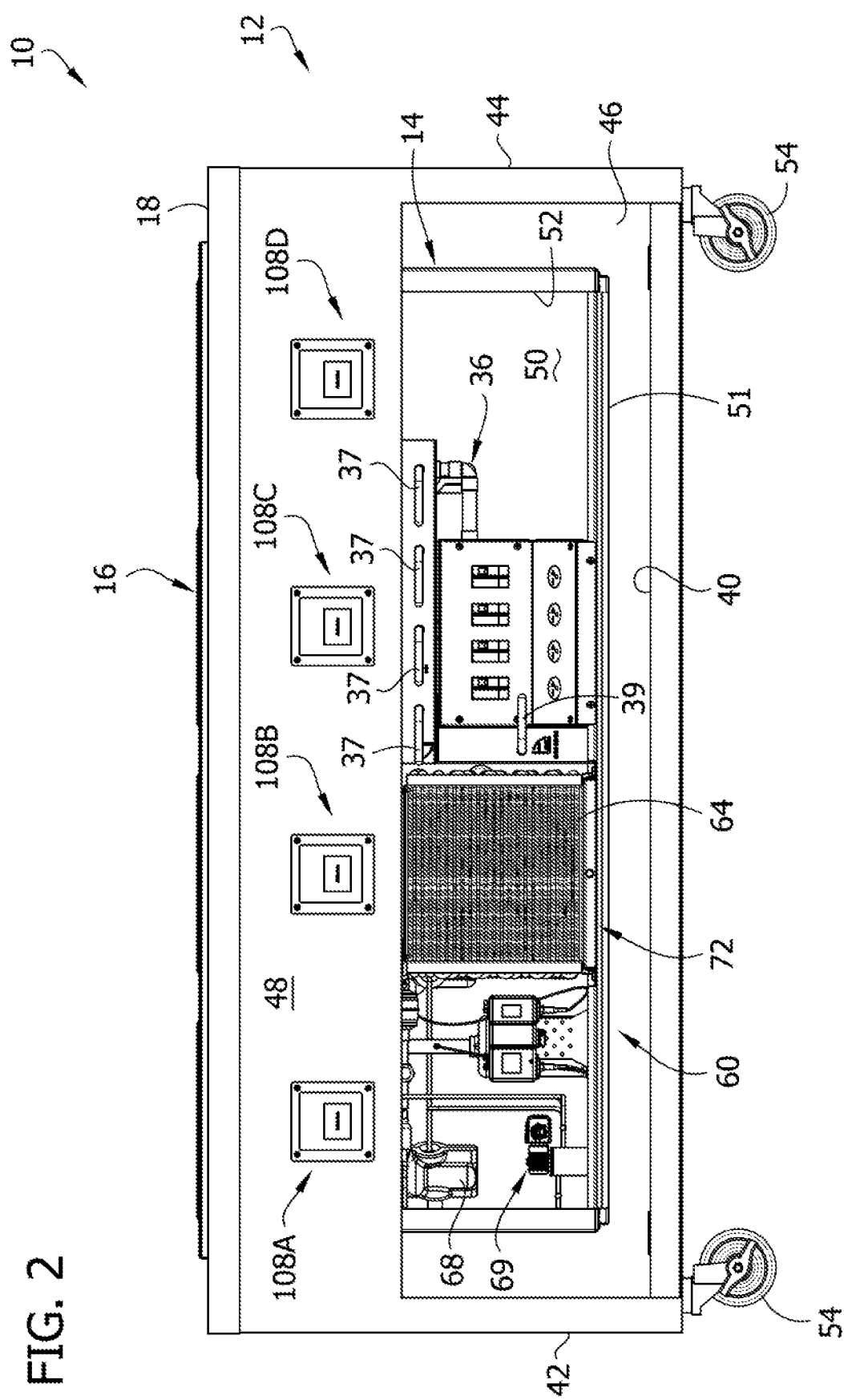
FIG. 2 is a front view of the food holding apparatus.
Figure 3:
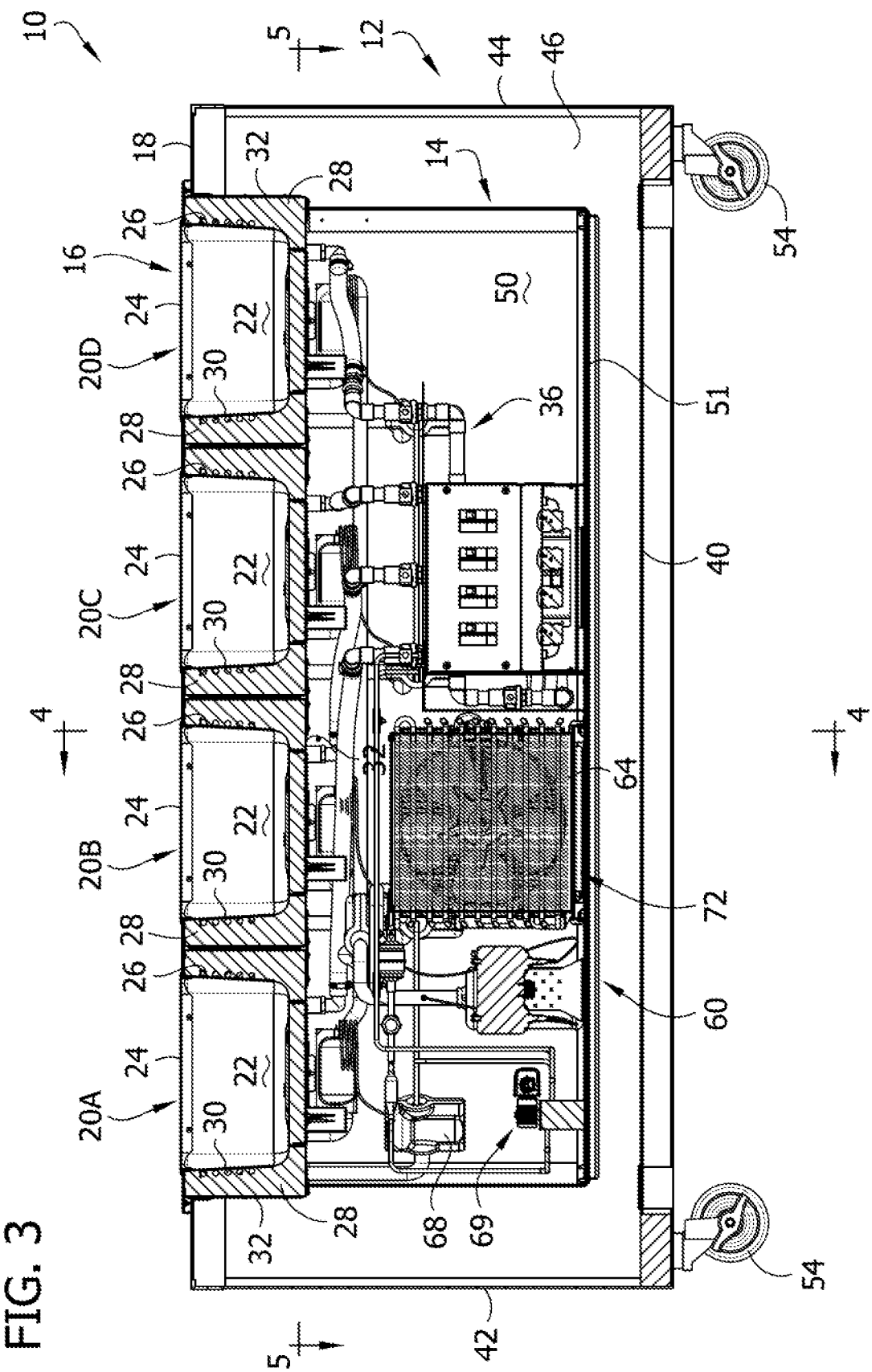
FIG. 3 is a cross section of the food holding apparatus taken through line 3-3 of FIG. 1.
Figure 4:
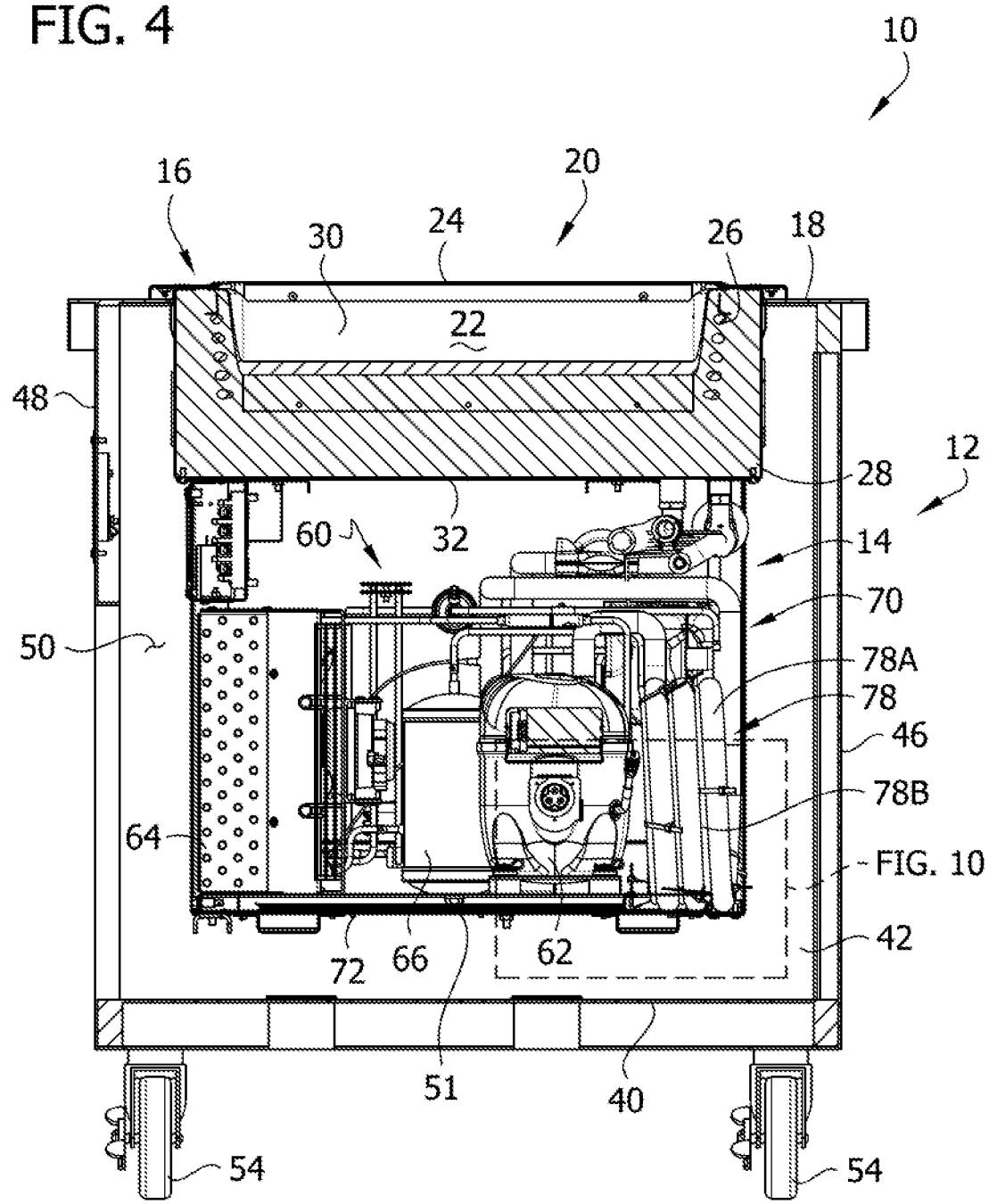
FIG. 4 is a cross section of the food holding apparatus taken through line 4-4 of FIG. 3.
Figure 12:
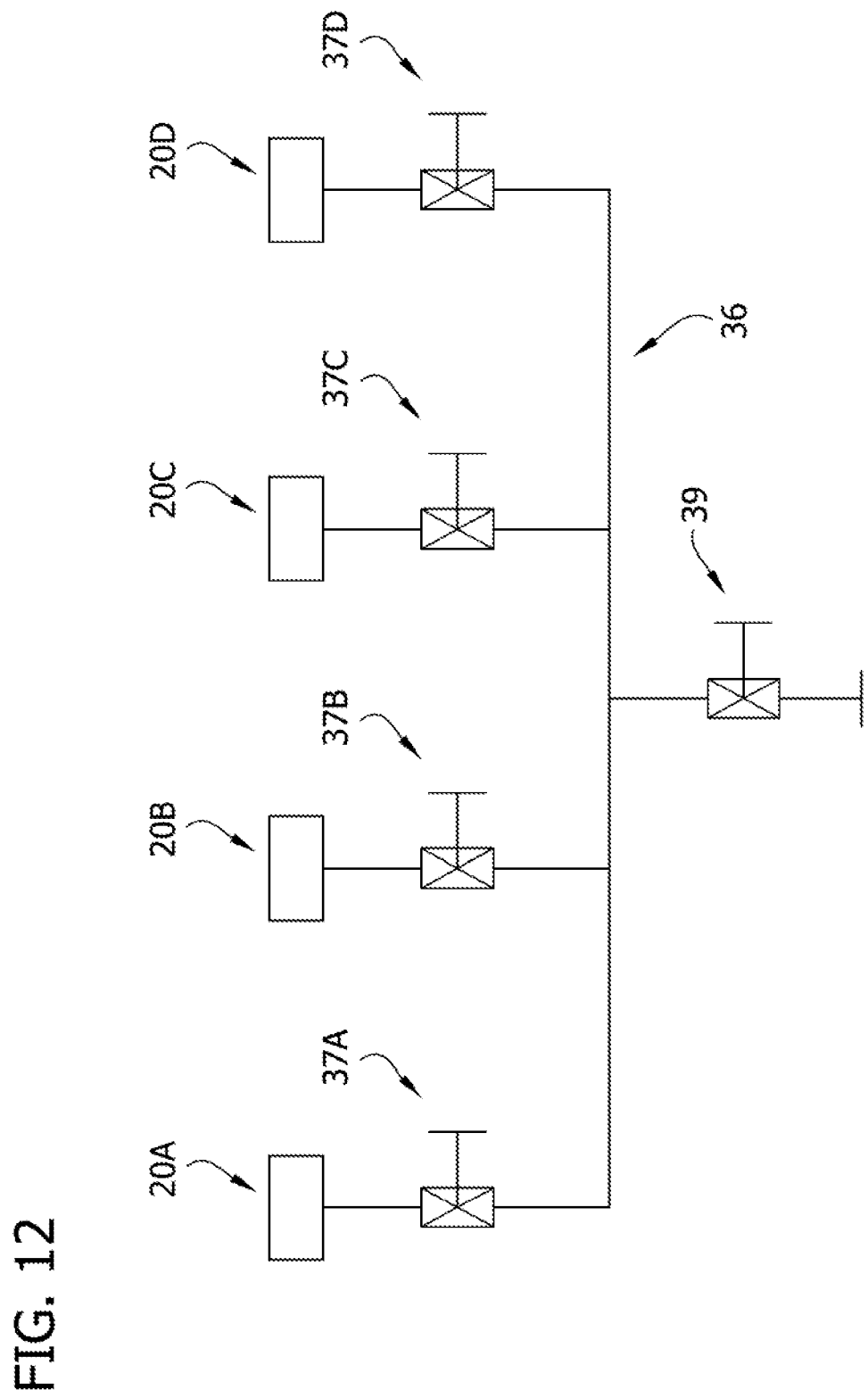
FIG. 12 is a schematic of a drainage system of the food holding apparatus.

Referring to FIGS. 2, 3 and 12, the food holding apparatus 10 may also include a drainage system 36 to drain fluid from each receiver 20. Each receiver 20 is fluidly connected to the drainage system 36 to drain fluid, such as water, from the cavity 22 of each receiver. For example, the food holding apparatus 10 may be used to provide "wet heat" in which the cavity 22 holds a water bath that is heated (as described below) and the water bath in turn heats a food tray disposed in the cavity. In other embodiments, the food holding apparatus 10 may be used to provide "dry heat" in which the cavity 22 does not hold any water. The drainage system 36 includes plumbing (e.g., pipes, fittings, etc.) connected to a drain of each receiver 20.

In the illustrated embodiment, the drainage system 36 includes an individual drain valve 37 for each receiver 20 and a master drain valve 39 for all the receivers. The individual drain valves 37 are fluidly disposed between the master drain valve 39 and their associated receiver 20. The master drain valve 39 allows all the receivers 20 (e.g., cavities 22 thereof), or a sub-set of the receivers, to be drained at the same time. The master drain valve 39 makes it easier and faster to drain the receivers over conventional systems which typically require each individual valve for each receiver to be opened to drain each receiver. For example, in use, each individual drain valve 37 can be opened and the master drain valve 39 can be closed to hold water in each receiver 20. When it is time to drain the water, only the master drain valve 39 needs to be opened to drain the receivers 20. In addition, the master drain valve 39 allows all the receivers 20, or a sub-set of the receivers, to be filled from a single receiver. For example, when the master drain valve 39 is closed and the individual drain valves 37 are open, a user can install water into one of the receivers 20. The water installed into the one receiver 20 will flow through that receiver's associated individual drain valve 37, will be blocked by the closed master drain valve 39, and will flow up into the other receivers having open individual drain valves, thereby filling the other receivers with water. This makes it easier to fill each receiver 20 with water. This process can be modified if the user does not want to fill all the receivers 20 with water by selectively closing the individual drain valves 37 of the receivers 20 the user does not want filled with water. In this case, the water poured into one receiver 20 will flow through that receiver's individual drain valve 37, will be blocked by the closed master drain valve 39 and the other receiver's closed individual drain valves, and will flow up into the other receivers with the open individual drain valves, thereby filling the desired number of receivers with water. Conventional food holding apparatus generally require a user to pour water into each individual receiver.

Figure 5:
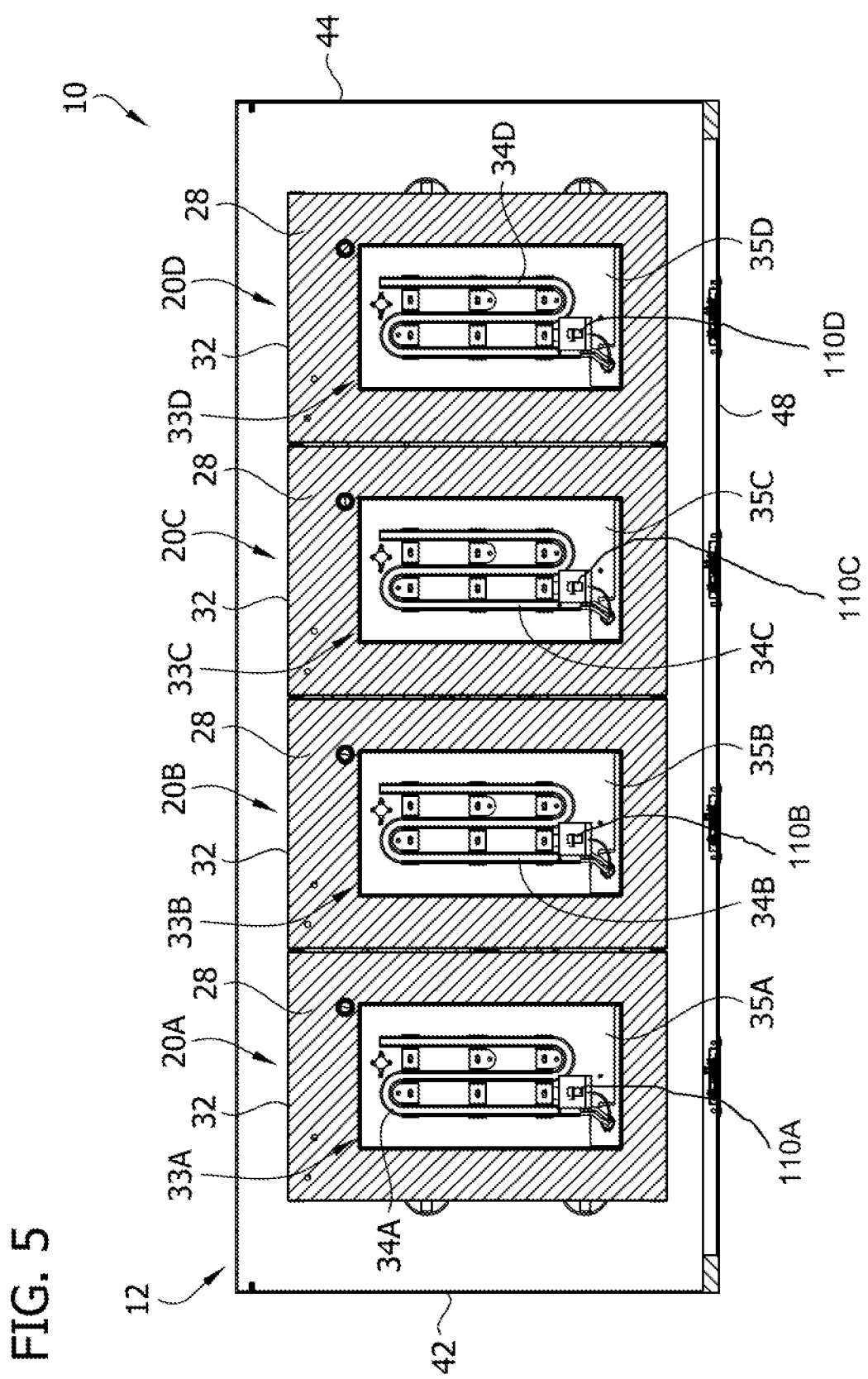
FIG. 5 is a cross section of the food holding apparatus taken through line 5-5 of FIG. 3 with portions of insulation cut out to reveal interior details.

Referring to FIG. 5, each receiver 20 also includes a heating mechanism 33 (broadly, a heater or food environment control device) configured to heat the tray of food when the tray of food is disposed in the cavity 22. Each heating mechanism 33 is disposed between the pan 30 and housing 32 and is generally adjacent the lower end of the cavity 22 (e.g., lower wall of the pan). The heating mechanisms 33 are generally identical. In the illustrated embodiment, each heating mechanism includes a rigid, heat distribution plate 35 and a heating element 34 thermally connected to the rigid heat distribution plate. The heat distribution plate is disposed between the element 34 and the bottom wall of the pan 30 to transfer and spread the heat from the heating element 34. The rigid heat distribution plate 35 may be made of any suitable material such as metal (e.g., steel, aluminum). The rigid heat distribution plate 35 is mounted to the underside of and is in direct conductive heat transfer contact with the bottom wall of the pan 30. The heating element 34 is mounted to and engages a lower surface of the heat distribution plate 35. The illustrated heating element 34 is an electrical resistance heater or heating element and, more specifically, is an electric bar heater having a serpentine shape (i.e., a serpentine bat heater). Other types of heating elements are within the scope of the present disclosure. One or more thermally conductive straps or brackets are used to secure the heating element 34 to the heat distribution plate 35. The insulation 28 underlies the heating mechanism 33.

The bottom wall of the housing 32 may include a removable access panel to allow a service person or technician to access the heating mechanism. For example, the service person can remove the access panel to replace the heating element 34 if the heating element fails.

Referring to FIGS. 1 and 2, the upper portion 16 of the housing 14 is supported by the cabinet 12 at the upper end thereof. The cabinet 12 includes a lower wall 40, opposite first and second end walls 42, 44 extending upward from respective opposite end edge margins of the lower wall, a rear wall 46 extending upward from the rear edge margin of the lower wall and between the first and second end walls, and a front wall 48 extending between the first and second end walls. In the illustrated embodiment, casters 54 are provided on the bottom of the lower wall 40 and allow the food holding apparatus 10 to be rolled over a floor or support surface. It will be understood that the food holding apparatus 10 may also be supported on the floor in other ways (e.g., by non-rolling feet, etc.). The cabinet 12 defines a cabinet interior in which the housing 14 is disposed. The housing 14 defines an interior 50 (e.g., a housing interior) and an opening 52 in communication with the housing interior and the cabinet interior. The front edge margin of the lower wall 40, the front edge margins of the first and second end walls 42, 44 and lower edge margin of the front wall 48 define a cabinet opening that permits access to the housing 14 and the housing interior 50. As is apparent, the interior 50 of the housing 14 houses various components of the food holding apparatus 10, with the opening 52 providing access to said components in the interior. In one embodiment, the food holding apparatus 10 may include one or more doors (not shown), such as solid doors and/or vented (e.g., louvered) doors, to close the cabinet interior.

The housing 14 includes a base 51. The base 51 is disposed below the upper portion 16 of the housing 14. In the illustrated embodiment, the housing 14 is suspended from the cabinet 12 such that the base 51 is spaced apart from the lower wall 40 of the cabinet. This makes it easier to install the housing 14 in different size cabinets by not having to match the height of the housing 14 to the size of the cabinet into which the housing is being installed. In other embodiments, the base 51 may rest on and be supported by the lower wall of the cabinet.

Referring to FIGS. 1-4, 6 and 11, the food holding apparatus 10 includes a refrigeration system 60 (broadly, a food environment control device) to cool the trays of food disposed in the receivers 20. The refrigeration system 60 is generally supported by the cabinet 12 and, more particularly, the housing 14. The refrigeration system 60 is fluidly coupled to each cooling coil 26 of the one or more receivers 20 to supply the one or more cooling coils 26 with the refrigerant to cool the tray of food held in the receiver. Accordingly, each tray of food received in the one or more receivers 20 can be held in refrigerated or freezing conditions. The refrigeration system 60 may include a compressor 62, a condenser 64, a refrigerant receiver 66, a refrigerant holding and metering valve 68 (which, broadly, acts as an expansion valve), and plumbing, generally indicated at 70. Broadly, the compressor 62, the condenser 64, and the refrigerant receiver 66 are part of a condensing unit 61 of the refrigeration system 60. The plumbing 70 fluidly connects the various components of the refrigeration system 60 and the one or more cooling coils 26 (which, broadly, act as an evaporator) together in a loop. For example, the plumbing 70 fluidly connects the compressor 62, the condenser 64, and the one or more cooling coils 26 together. Broadly, the cooling coils 26 may be considered part of the refrigeration system 60. Persons having ordinary skill in the art will understand that the surrounding environment (e.g., cavity 22 and tray of food) will be cooled by the cooling coil 26 as the refrigerant flows through the coil. The plumbing 70 includes pipes, fittings, valves (e.g., ball valves, solenoid valves), manifolds, etc. to fluidly connect the components of the refrigeration system 60 together.

Figure 10:
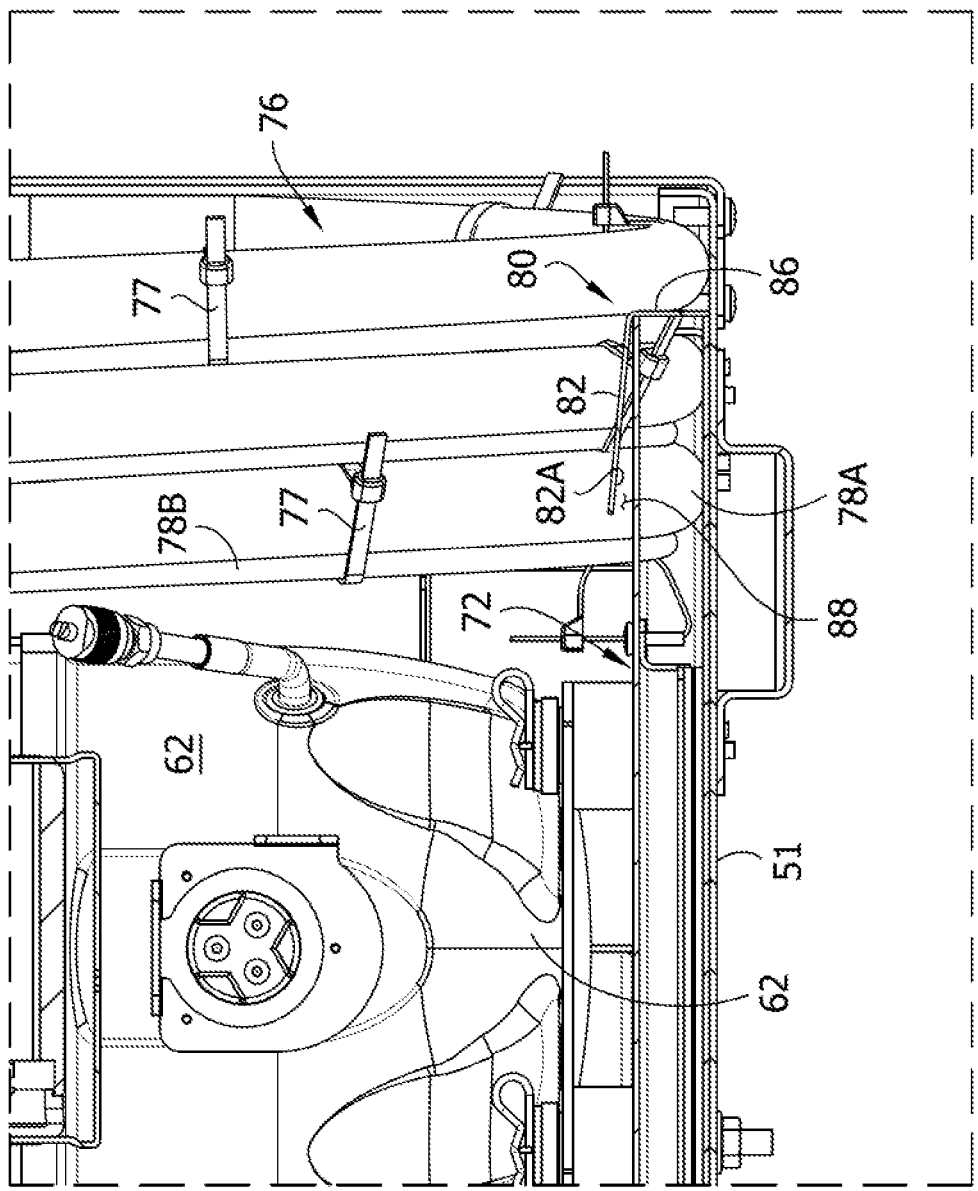
FIG. 10 is an enlarged portion of FIG. 4.
Figure 11:
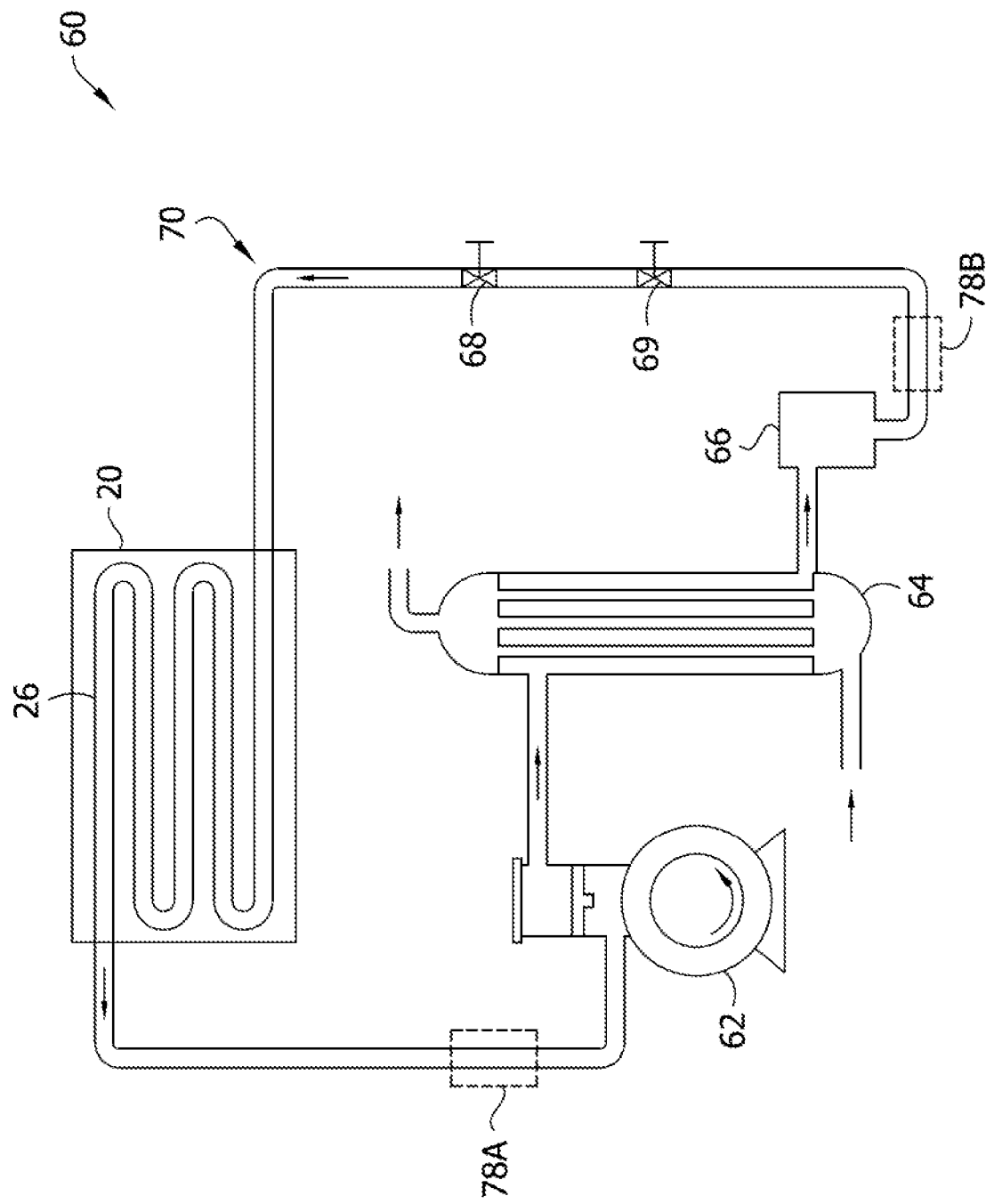
FIG. 11 is a schematic of a refrigeration system of the food holding apparatus.

An example refrigeration system 60 is shown schematically in FIG. 11. This schematic diagram corresponds to the food holding apparatus 10 having only one receiver 20 (e.g., one cooling coil 26). If the food holding apparatus 10 includes multiple receivers 20, such as the embodiment illustrated in FIGS. 1-10, each receiver (e.g., cooling coil 26) will have a corresponding refrigerant holding and metering valve 68 and the plumbing 70 will include a first manifold between the refrigerant receiver 66 and the metering valves to distribute the refrigerant to each metering valve and a second manifold between the receivers and the compressor to collect the refrigerant from each receiver. Each refrigerant holding and metering valve 68 includes a reservoir configured to hold an amount or supply of refrigerant and a valve (e.g., an expansion valve). The refrigeration system 60 also includes a valve (e.g., a solenoid valve) that can be actuated to selectively release the refrigerant held in the refrigerant receiver 66, through the refrigerant holding and metering valve 68 and to the corresponding cooling coil 26. If the food holding apparatus 10 includes multiple receivers 20, each receiver (e.g., cooling coil 26) will have a corresponding valve 69 between the refrigerant receiver 66 and the refrigerant holding and metering valve 68 to distribute the refrigerant to each metering valve. As understood by persons having ordinary skill in the art, the amount of refrigerant released by the valve 69 corresponds to the amount of cooling provided by the corresponding cooling coil 26. For example, the more refrigerant released by the valve 69 and flowing through the corresponding cooling coil 26, the more cooling provided by the cooing coil (e.g., a lower temperature can be reached).

Refrigeration systems having other configurations are within the scope of the present disclosure. For example, refrigeration systems other than vapor-compression refrigeration systems may be used. For example, the refrigeration system may include a heat pump, Peltier device, solid state refrigerator, or thermoelectric cooler.

Figure 6:
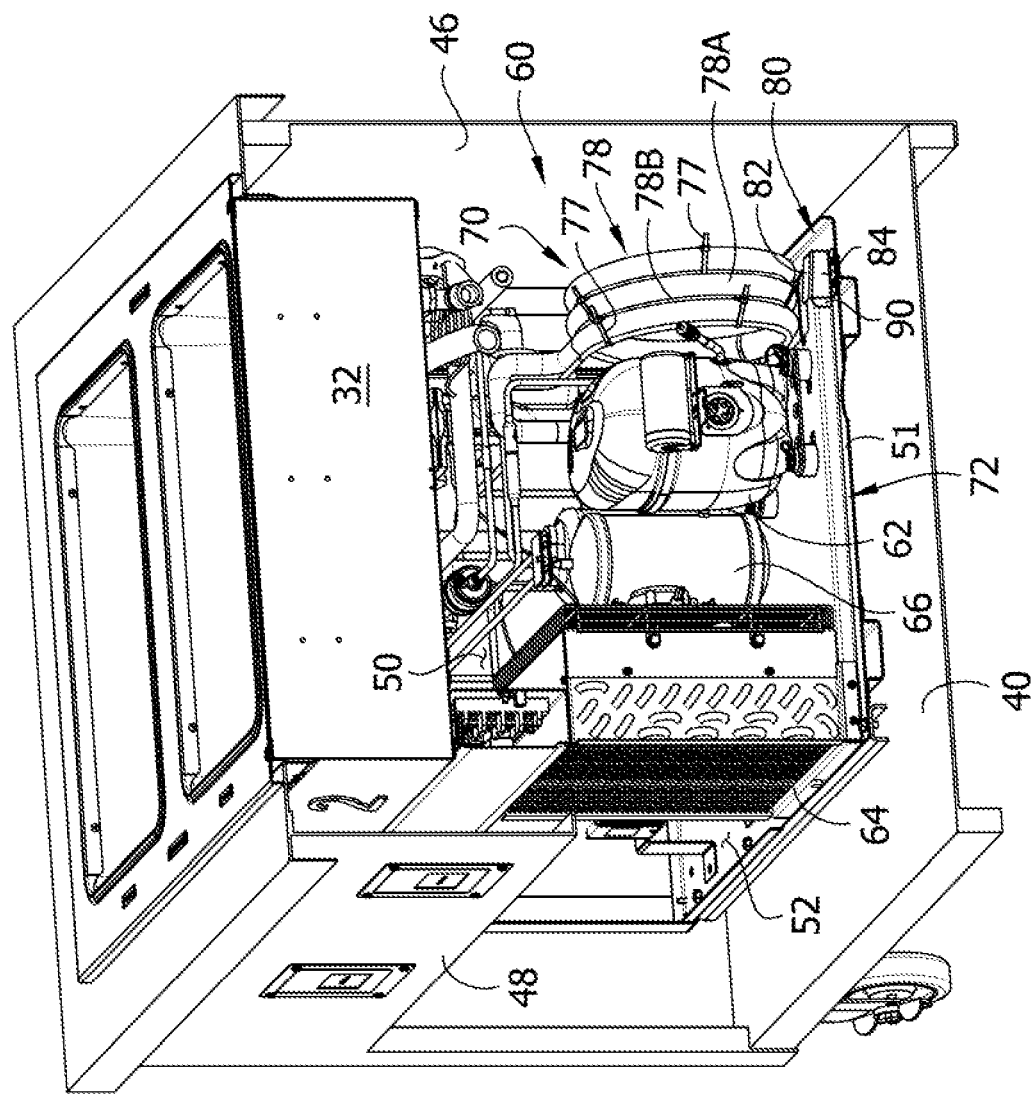
FIG. 6 is an enlarged, fragmentary cross section perspective of the food holding apparatus showing interior details.
Figure 7:
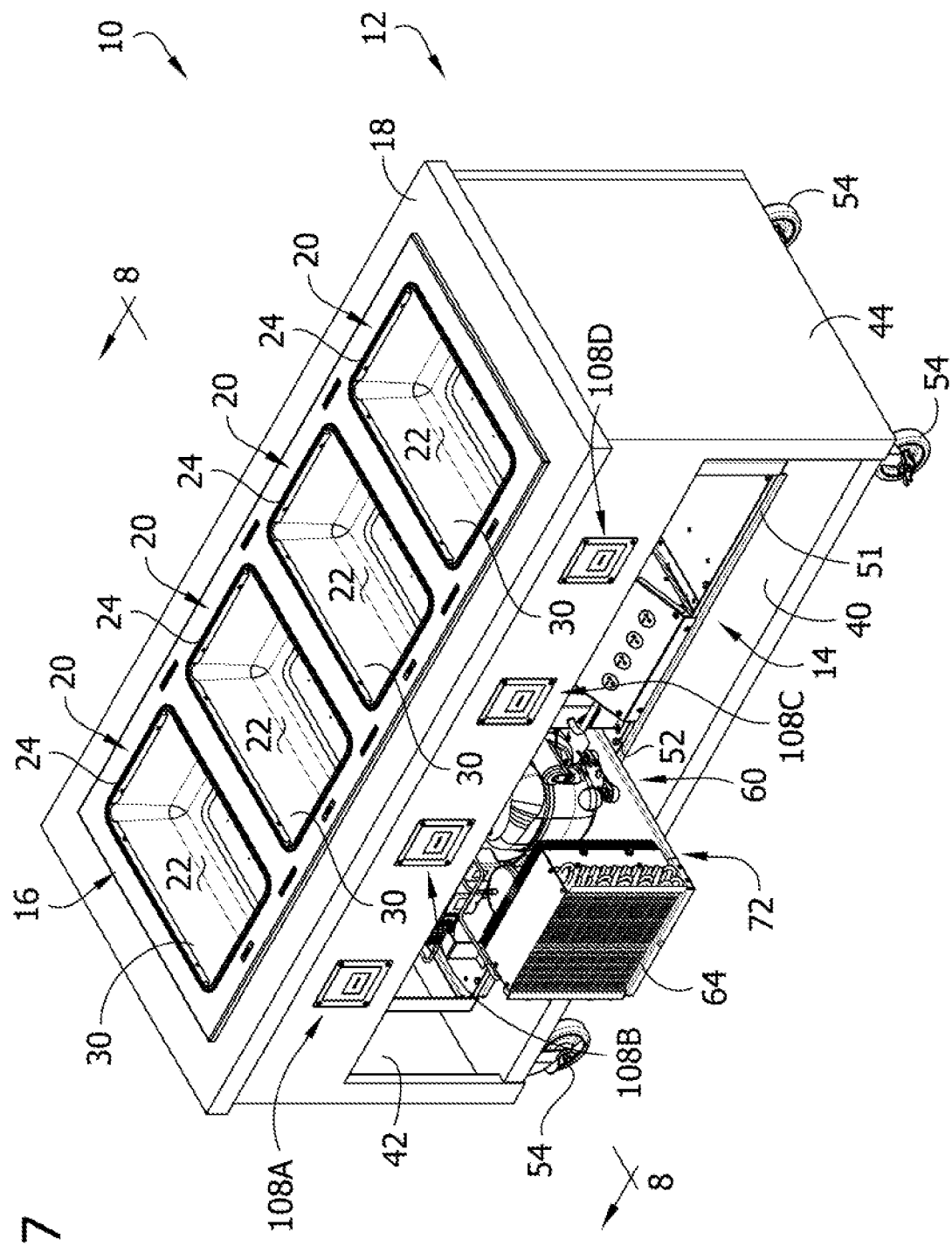
FIG. 7 is a perspective of the food holding apparatus with the support in an access position.
Figure 8:
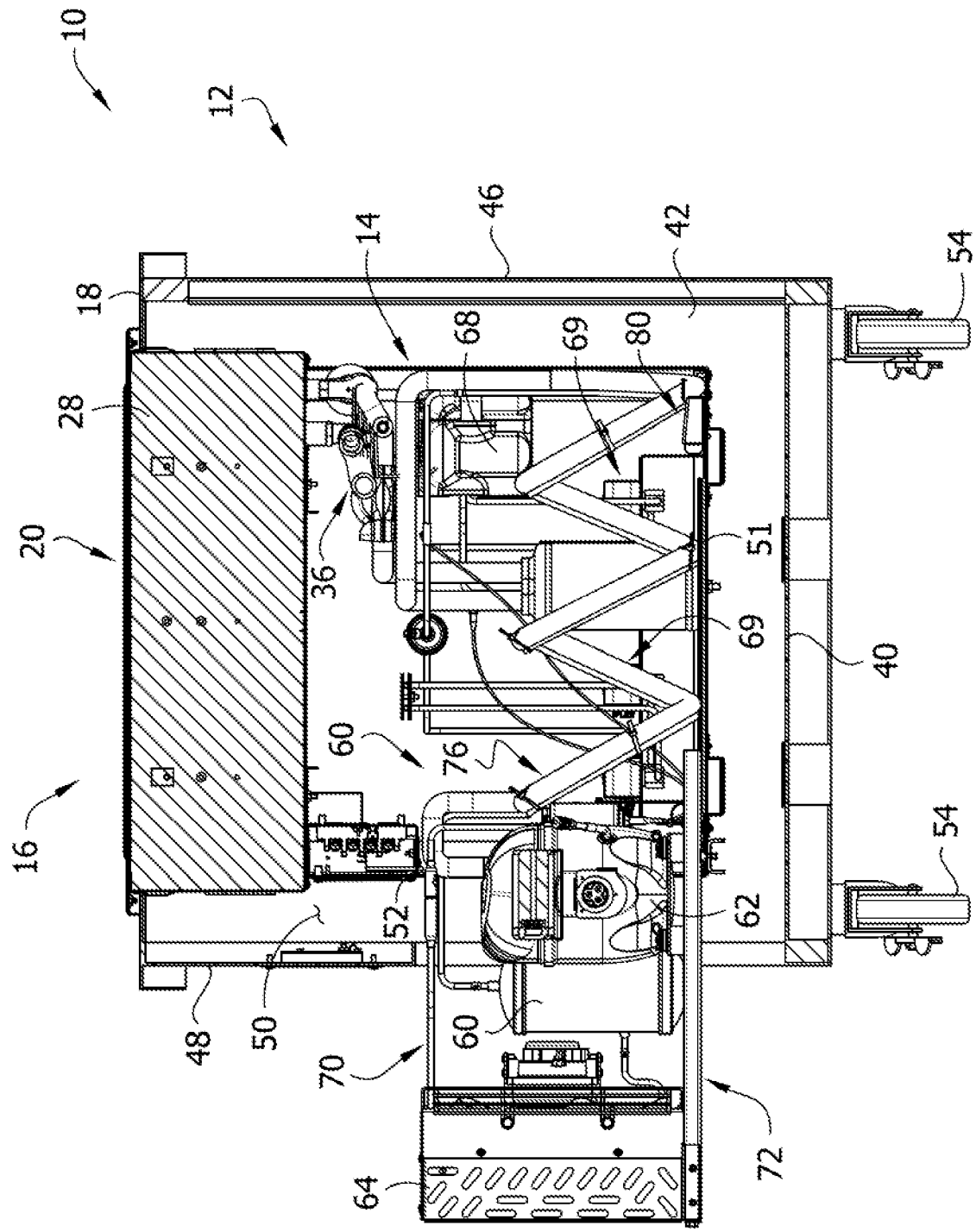
FIG. 8 is a cross section of the food holding apparatus taken through line 8-8 of FIG. 7.
Figure 9:
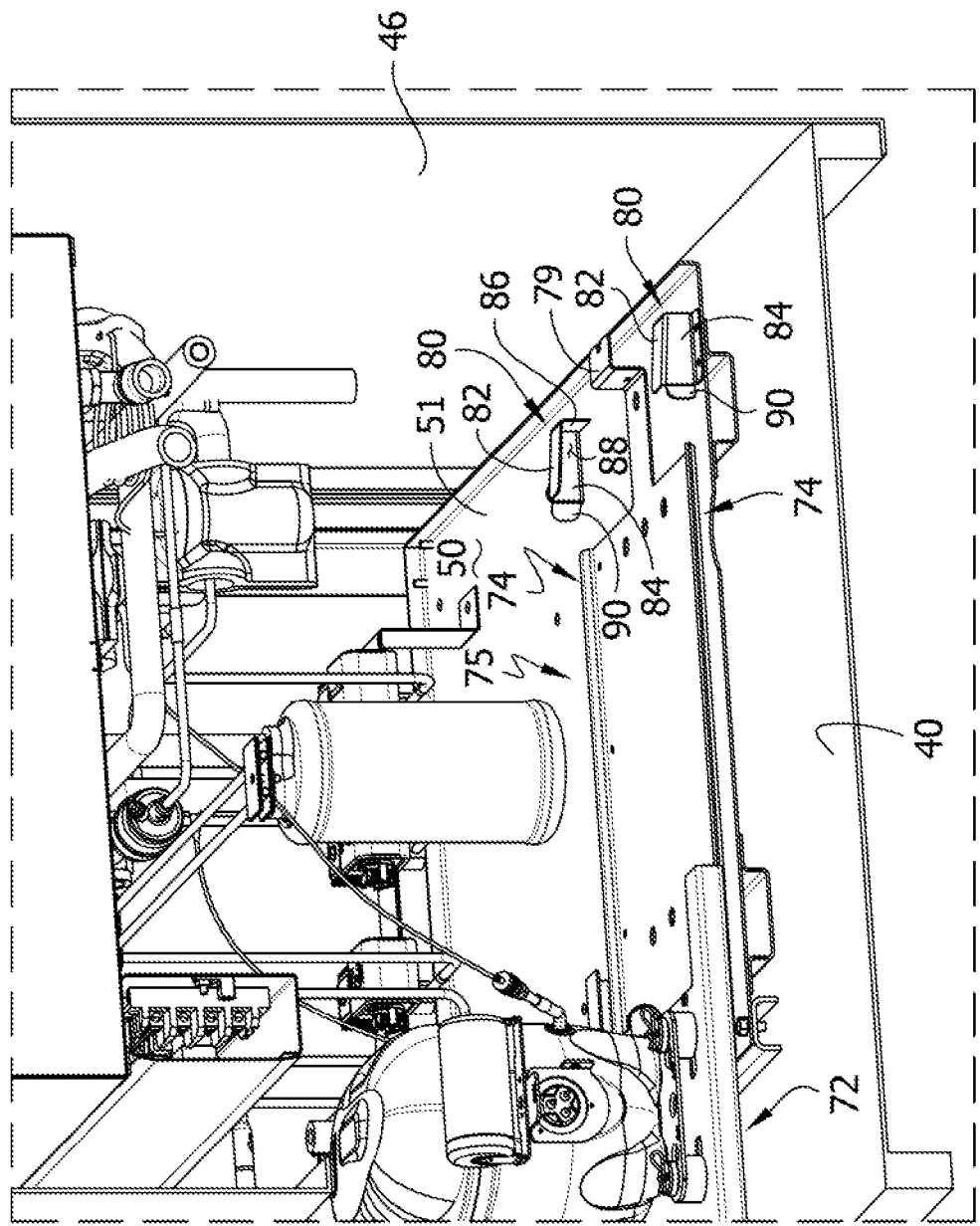
FIG. 9 is an enlarged, fragmentary cross section perspective of the food holding apparatus of FIG. 7 with portions of the food holding apparatus hidden from view to show interior details.

Referring back to FIGS. 1-4 and 6-10, the housing 14 of the food holding apparatus 10 includes a support or sled 72 movable relative to the housing. The support 72 is moveably connected to (e.g., slideably mounted on) the base 51 of the housing 14. The support 72 is movable between a stored or stowed position (FIGS. 1-4, 6 and 10) and an access position (FIGS. 7-9). Generally, the support 72 supports at least a portion of (e.g., one or more components of) the refrigeration system 60, thereby moving said portion of the refrigeration system 60 between the stored and access positions, as explained in more detail below. In the illustrated embodiment, the support 72 includes a generally planar platform, although other configurations are within the scope of the present disclosure. The housing 14 includes a track 75 mounted to the base 51 and along which the support 72 moves (e.g., slides). Specifically, the track 75 movably connects the support 72 to the base 51. The track 75 includes a pair of rails 74 (broadly, one or more rails) upon which the support 72 moves. The support 72 is longitudinally slideable along the rails 74 between the stored and access positions.

In the stored position, the support 72 is disposed (e.g., entirely disposed) in the interior 50 of the housing 14. In the access position, the support 72 is at least partially disposed outside of the interior 50. In the illustrated embodiment, a portion of the support 72 remains disposed in the interior 50 when the support is in the access position. In other embodiments, the support 72 may be disposed entirely outside the interior 50 when in the access position. As shown in FIGS. 7-9, the support 72 is in a cantilevered arrangement when the support is in the access position, and the track 75 supports the support 72 against tipping forward in the cantilevered arrangement of the access position. As shown in FIGS. 6-8, the support 72 moves through the opening 52 (and the cabinet opening) when the support is moved toward the stored and access positions. In other words, the support 72 moves into and out of the housing 14 through the opening 52 and in and out of the cabinet 12 through the cabinet opening.

As mentioned above, the support 72 supports one or more components of the refrigeration system 60 (e.g., the one or more components are mounted on the support). This allows the supported refrigeration components to be moved between the stored and access positions. Specifically, this allows the supported refrigeration components to be moved out of the interior 50 and/or closer to the opening 52 in the housing 14. By moving these supported refrigeration components to the access position, via the support 72, it is easier for a technician to access (e.g., reach) these components to perform maintenance and/or replace these components when they fail. Otherwise, a technician would need to remove components of the food holding apparatus 10, such as the condenser 64, the rear wall 46, the upper portion 16, etc., to access at least some of the other components (e.g., the compressor 62) of the refrigeration system 60. It is understood that other components of the food holding apparatus 10, besides components of the refrigeration system 60, may be supported by the support 72 to be movable between the stored and access positions.

In one embodiment, at least one of the compressor 62 and condenser 64 is supported by the support 72 and is movable with the support between the stored and access positions. In the illustrated embodiment, both the compressor 62 and condenser 64 (as is the refrigerant receiver 66) are supported by the support 72 and are movable with the support between the stored and access positions. Other components of the refrigeration system 60 may be supported by the support 72 and, thereby, also movable between the stored and access positions. When the support 72 is in the stored position, all of the components (e.g., compressor 62, condenser 64, etc.) of the refrigeration system 60 are disposed in the interior 50. When the support 72 is in the access position, preferably, at least one of the components (e.g., compressor 62, condenser 64, etc.) of the refrigeration system is disposed outside the interior 50. This provides easier access to these components for the technician. For example, in one embodiment, the condenser 64 and/or compressor 62 may be disposed outside the interior 50 when the support 72 is in the access position. In the illustrated embodiment, the refrigerant receiver 66 (generally) and the condenser 64 are disposed outside of the interior 50 when the support 72 is in the access position (FIG. 8). It is understood that the support 72 does not have to position the components of the refrigeration system 60 outside of the interior 50 when the support is moved to the access position to provide a technician with easier access to said components. Instead, simply moving (via the support 72) the component(s) closer (e.g., toward) the opening 52, while still being disposed in the interior 50, can be sufficient to provide the technician with the necessary access to said component(s). For example, in the illustrated embodiment, the compressor 62 is spaced apart from the opening 52 in the stored position (FIG. 4) and adjacent the opening 52 in the access position (FIG. 8). In other words, the compressor 62 is farther from the rear wall 46 when the support 72 is in the access position than when the support is in the stored position. This provides the technician with sufficient access to the compressor 62 to perform any maintenance or replacement.

Referring to FIGS. 4, 6, 8, and 10, the plumbing 70 includes at least one connector, generally indicated at 78, configured to permit the at least one refrigeration component (e.g., the compressor 62 and/or the condenser 64, etc.) of the refrigeration system 60 supported by the support 72 to move between the stored and access positions while remaining attached to the plumbing. The connector 78 allows the technician to move the support 72 and refrigeration components thereon between the stored and access positions without having to disconnect the one or more of the components from the plumbing 70. The connector 78 may comprise a flexible or pliable pipe (e.g., a length of flexible or pliable pipe). In the illustrated embodiment, the connector 78 comprises a coiled flexible pipe (e.g., a flexible pipe that is coiled). The coiled flexible pipe 78 is arranged to expand as the support 72 is moved from the stored position toward the access position and to contract as the support is moved from the access position to the stored position. This allows the support 72 and components of the refrigeration system 60 supported thereby to be moved between the stored and access positions. The coiled flexible pipe 78 is coiled such that it forms a plurality of hoops. The hoops are closer together relative to one another (e.g., not longitudinally stretched) when the support 72 is in the stored position than when the support is in the access position. When the support 72 is moved toward the access position, the hoops of the coiled flexible pipe 78 are spread apart (e.g., are longitudinally stretched extending in the front-to-back dimension of the helical shape of the coiled pipe) to permit the movement of the support and refrigeration components thereon. In the illustrated embodiment, the coiled flexible pipe 78 includes three hoops, although more or fewer hoops are within the scope of the present disclosure. A retainer 79, connected to the base 51, is provided to hold and retain the rear hoop of the coiled flexible pipe 78 in position as the support 72 is moved forward. This causes the coiled flexible pipe to extend like a coil spring as the coiled pipe is pulled forward with the support 72. The retainer 79 includes an upstanding first portion and a second portion extending rearward to capture the rear hoop of the coil 78 thereunder. In the illustrated embodiment, the coiled flexible pipe 78 comprises a copper tube, such as a ⅜ inch diameter copper tube. The copper tube is flexible or pliable because when the copper tube is coiled, the coil of the coiled copper tube expands and contracts as the support 72 is moved (e.g., manually moved) between the stored and access positions. It is understood the coiled flexible pipe may be made of other suitable materials, such as rubber. Other types of connectors are also within the scope of the present disclosure. For example, the connector can comprise a longitudinally extendable (e.g., telescoping) pipe or a longitudinally expandable pipe.

In the illustrated embodiment, the at least one connector 78 of the plumbing 70 includes a first connector 78A and a second connector 78B. The refrigeration system 60 is a closed loop refrigeration system. There is one pipe or conduit carrying refrigerant flowing toward the refrigeration components on the support 72 and there is another pipe or conduit carrying refrigerant flowing away from the refrigeration components on the support. In the illustrated embodiment, both the first and second connectors 78A, 78B are coiled flexible pipes. The first connector 78A is disposed (e.g., fluidly disposed or coupled) between the compressor 62 and the one or more cooling coils 26. The refrigerant flows through the first connector 78A as the refrigerant flows from the one or more cooling coils 26 to the compressor 62. A schematic representation of where the first connector 78A is located within the refrigeration system 60 is shown in FIG. 11. The second connector 78B is disposed (e.g., fluidly disposed or coupled) between the condenser 64 (more specifically, the refrigerant receiver 66) and the one or more cooling coils 26. The refrigerant flows through the second connector 78B as the refrigerant flows from the condenser 64 to the one or more cooling coils 26. A schematic representation of the where the second connector 78B is located within the refrigeration system 60 is shown in FIG. 11. As mentioned above, the first and second connectors 78A, 78B allow the compressor 62 and condenser 64 (and refrigerant receiver 66) to move between the stored and access positions while remaining attached to the plumbing 70. Desirably, the hoops of the first and second connectors 78A, 78B are connected together. This way, the hoops of the first and second connectors 78A, 78B move with each other when the support 72 is moved between the stored and access positions. One or more bands 77 (e.g., zip ties) may be used to secure the hoops of the first and second connectors 78A, 78B together.

Referring to FIGS. 6, 9, and 10, the food holding apparatus 10 includes at least one stop or holder 80 that positions the support 72 in the stored position when the support is moved from the access positon toward the stored position. Specifically, the at least one stop 80 engages the support 72 to position the support in the stored position. In addition, each stop 80 may also hold the support 72 in the stored position. In the illustrated embodiment, the food holding apparatus 10 includes two stops 80, the stops being mirror images of one another. In this embodiment, each stop 80 engages a corner of the support 72. As shown in FIG. 9, each stop is fixed to the base 51. In the illustrated embodiment, each stop 80 includes an upper wall 82, a side wall 84 and a rear wall 86. The upper, side, and rear walls 82, 84, 86 cooperate to define a receiving space 88 sized and shaped to receive the support 72 (e.g., a corner thereof). Each stop 80 may also include a guide tab 90 (broadly, "ramp" or "guide") extending at a forward and outward angle (relative to the longitudinal movement of the support 72) from the side wall 84 to guide the support into the receiving space 88 when the support is moved toward the stored position.

Desirably, each stop 80 includes at least one ramped or tapered surface 82A (FIG. 10) configured to engage the support 72 when the support is moved toward the stored position to position the support in the stored position. In the illustrated embodiment, the tapered surface 82A is the lower surface of the upper wall, but other configurations are within the scope of the present disclosure. For example, instead of or in addition to the tapered surface 82A on the upper wall 82, the interior surface (i.e., the surface defining the receiving space 88) of the side wall 84 may be tapered. For the purposes of the illustrated stop 80, a tapered surface 82A is a surface that extends towards (from a front edge to a rear edge) the space occupied by the support 72 when the support is in the stored position. Thus, the tapered surface 82A is oriented at a skewed angle relative to the axial direction of travel of the support 72, as shown in FIG. 10. When the support 72 is moved toward the stored position, the support (in this case the leading or rear edge margin thereof) contacts the tapered surface 82A of the stop 80, generating friction force therebetween because the support is being squeezed between the tapered surface and the track 75. As the support 72 continues to move (e.g., continues to move in a rearward direction) toward the stored position, the friction force between the tapered surface 82A and the support 72 increases until the friction force stops the movement of the support, thereby positioning the support in the stored position. Accordingly, the support 72 and the one or more components of the refrigeration system 60 thereon are gradually stopped in the stored position by the stops 80, instead of being suddenly stopped. This prevents any components supported by the support 72 from becoming damaged or disconnected when the support is positioned in the stored position, as may occur with a sudden stop. Moreover, the friction force between the stop 80 and the support 72 also holds the support in the stored position. This limits rattling or other noise that may be caused by vibration or other movement of the support 72 in the retracted position. To move the support 72 toward the access position, a technician applies a sufficient amount of force in the forward direction (e.g., pulls) to overcome the friction force between the stop 80 and the support 72, thereby moving the support toward the access position.

Figure 13:
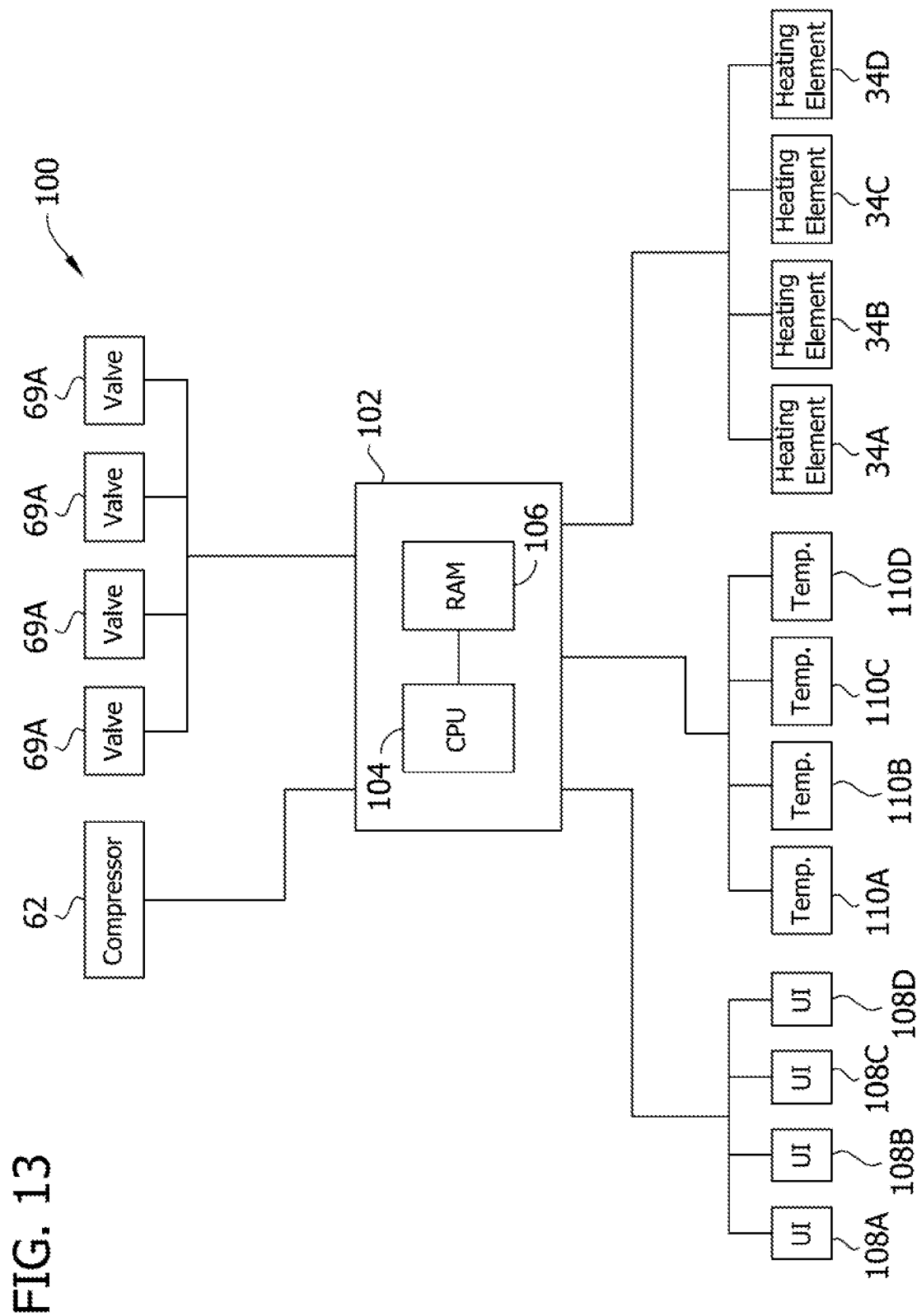
FIG. 13 is a schematic of one embodiment of a control system for the food holding apparatus according to the present disclosure.

As shown schematically in FIG. 13, a control system 100 for the food holding apparatus 10 includes a controller 102 (e.g., a temperature controller) having a CPU or processor 104 and RAM or memory 106 (broadly, non-transitory computer-readable storage medium). The controller 102 provides the computing engine that drives the operation of the food holding apparatus 10. Broadly, the memory 106 includes (e.g., stores) processor-executable instructions for controlling the operation of the processor 104. The instructions embody one or more functional aspects of the food holding apparatus 10, as described herein, with the processor 104 executing the instructions to perform said one or more functional aspects.

In particular, the controller 102 is configured to control the temperature of each receiver 20, thereby keeping each tray of food at a desired temperature. The controller 102 is communicatively coupled to and responsive to a user interface 108 for controlling the temperature of each receiver 20. The user interface 108 can receive instructions or user input from a user, with the controller 102 carrying out the instructions. For example, the instructions from the user can include a desired set point temperature for each receiver 20. The user interface 108 may include a display to display information to the user, such as the actual and/or set point temperature of the receiver 20. Any suitable user interface, such as a touch screen, is within the scope of the present disclosure. For example, the user interface may include different types of input devices such as keyboards, mice, buttons, switches, or even microphones for receiving information from the user. In the illustrated embodiment, the food holding apparatus 10 includes four user interfaces 108A-D, each user interface corresponding to one of the receivers 20. Each user interface 108 is mounted on the cabinet 12. Desirably, each user interface 108 is arranged to be visually associated with one of the receivers 20. For example, as illustrated, each user interface 108 is mounted on the cabinet 12 directly in front of one of the receivers 20, thereby associate each user interface with a particular receiver. This allows the user to quickly and effortlessly control the temperature of each receiver 20 by easily identifying and interacting with the user interface 108 for a particular receiver.

The controller 102 can control the temperature of each receiver 20 independently of the other receivers. For example, the temperature of on receiver 20 can be cold while the temperature of another receiver is hot. Accordingly, the temperature of each receiver 20 is independently controllable such that any combination of the receivers can be heated and/or cooled. The controller 102 is also communicatively coupled to the compressor 62 (broadly, the condensing unit 61), the solenoid valves 69A-D (broadly, the refrigeration system 60) and the heating mechanism 33A-D (e.g., heating elements 34A-D) of each receiver 20 to selectively activate (e.g., operate) these components to cool or heat each receiver 20 according to a set point temperature. Temperature sensors 110A-D at each receiver 20 are communicatively coupled to the controller 102 to relay the current or actual temperature of each receiver to the controller. The controller 102 uses the information from each temperature sensor 110A-D to selectively activate (e.g., automatically activate) the compressor 62, the solenoid valves 69A-D and/or the heating elements 34A-D as needed to individually cool and/or heat each receiver so that the actual temperature of each receiver 20 is controlled based on the desired set point temperature for that receiver. Accordingly, each receiver 20 can be heated or cooled independently, regardless of whether any other receivers are being heated or cooled.

For example, if the controller 102 receives information from a temperature sensor 110 indicating the temperature of one of the receivers 20 is below the set point temperature (entered via the user interface 108), the controller can activate or increase the intensity (e.g., heat output) of the corresponding heating element 34 to raise the temperature of the receiver to the set point temperature. After the temperature of the receiver 20 is raised to match the set point temperature, the controller 102 may deactivate or decrease the intensity of the corresponding heating element 34 to hold the temperature of the receiver at the set point temperature according to a hysteresis. Similarly, if the controller 102 receives information from a temperature sensor 110 indicating the temperature of one of the receivers 20 is above the set point temperature, the controller can activate (e.g., open) the corresponding solenoid valve 69 to start or increase the flow of the refrigerant through the corresponding cooling coil 26 to lower the temperature of the receiver to the set point temperature. After the temperature of the receiver 20 is lowered to match the set point temperature, the controller 102 may close the corresponding solenoid valve 69 to shut off or decrease the flow of refrigerant to the corresponding cooling coil 26 to hold the temperature of the receiver at the set point temperature according to a hysteresis. In addition, when cooling is required, the controller 102 can also activate the compressor 62.

Figure 14:
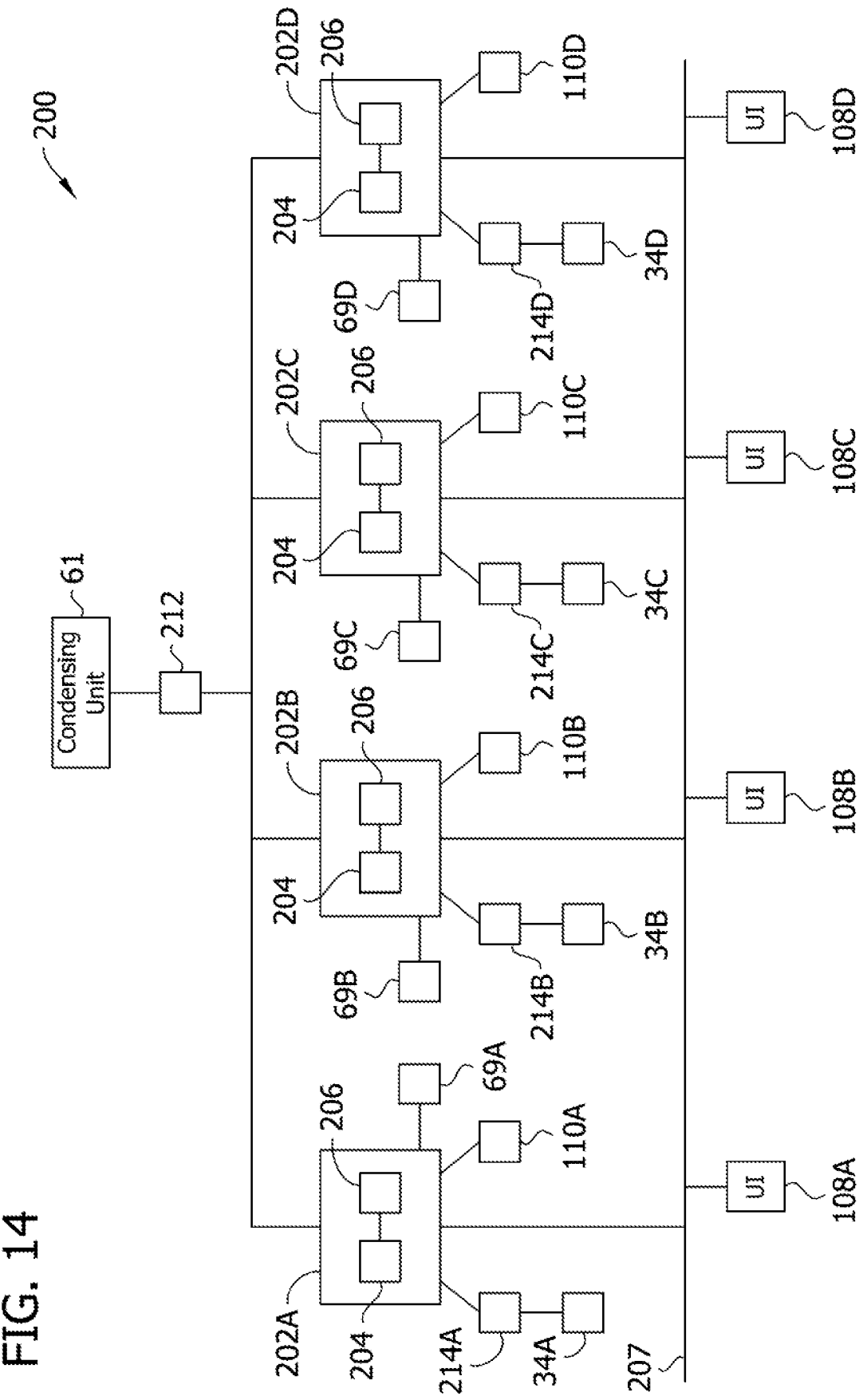
FIG. 14 is a schematic of another embodiment of a control system for the food holding apparatus according to the present disclosure.

Referring to FIG. 14, another embodiment of a control system 200 for the food holding apparatus 10 is shown. Except for the differences discussed below, the control system 200 of FIG. 14 is generally the same and operates in generally the same way as the control system 100 of FIG. 13. In this embodiment, the control system 200 is a distributed control system. The control system 200 includes a controller 202 (e.g., a food receiver controller) for each receiver 20. Each controller 202 includes a CPU or processor 204 and RAM or memory 206, as described above. The control system 200 includes a controller area network ("CAN") bus 207. Each controller 202 and each user interface 108 is connected to the CAN bus 207. The CAN bus 207 communicatively couples all the controllers 202 and the user interfaces 108 together. Generally, each user interface 108 will generally only interact with one of the controllers 202. However, in the event one user interface fails 108, the CAN bus 207 allows another user interface to interact with (e.g., receiver user input to set the set point temperature) the controller 202 associated with the failed user interface in order to keep controlling the temperature of the receiver 20 associated with the failed user interface. This provides a level of redundancy that enables all the receivers 20 to continue to be either heated or cooled, even though a user interface 108 may fail. Further details regarding CAN buses can be found in U.S. Pat. No. 9,746,842, the entirety of which is hereby incorporated by reference.

Each controller 202 is associated with one of the receivers 20. Each controller 202 is configured to operate the heating mechanism 33 of the receiver 20 the controller is associated with and the refrigeration system 60 to selectively cool or heat the receiver associated with the controller. In the illustrated embodiment, the control system 200 includes a condensing unit relay 212 (e.g., a mechanical or electro-mechanical relay). Each controller 202 is communicatively coupled to the condensing unit relay 212 to selectively operate the condensing unit relay to turn the condensing unit 61 (e.g., compressor 62, condenser 64 (e.g., a fan motor thereof)) on and off. The control system 200 also includes a heating mechanism relay 214 (e.g., a solid state relay). Each heating mechanism relay 214 is connected to the heating element 34 of the receiver 20 that the heating mechanism relay is associated with. Each controller 202 selectively operates its corresponding heating mechanism relay 214 to turn the corresponding heating element on or off. Providing the relays 212, 214 permits the controller 202 (e.g., circuit board(s)) to be isolated from the large electrical loads to the condensing unit 61 and heating elements 34. This reduces the likelihood of the controllers 202 failing. This also makes it easier to replace these relays 212, 214 over conventional food holding apparatuses which have electrical relays integrated into circuit boards. Should a relay 212, 214 fail, a user simply needs to replace the relay instead of having to replace an entire circuit board. It is much cheaper to replace a relay 212, 214 than an entire circuit board. Each controller 202 is also communicatively connected to the temperature sensor 110 of the receiver 20 each controller is associated with. Each controller 202 is also communicatively connected to the solenoid valve 69 of the receiver each controller is associated with. In the illustrated embodiment, each controller 202 is directly connected to the condensing unit relay 212, its heating mechanism relay 214, its temperature sensor 110, and its solenoid valve 69. In other embodiments, one or more (e.g., all) of these components may be communicatively connected to the CAN bus 207 such that the said one or more components are communicatively connected to the controller 202 via the CAN bus. Desirably, the controllers 202, the CAN bus 207, the condensing unit relay 212, and the heating mechanism relay 214 are all mounted within a channel or chase extending along the front of the housing 14. This way these components are easily accessible to a technician should any of them need to be serviced or replaced. Other configurations of the control system are within the scope of the present disclosure.

As used herein and in the drawings, when a reference character includes a reference numeral not followed by a letter, such a reference character refers to all elements designated at least in part by the reference numeral. Moreover, when a reference character includes the reference numeral followed by a letter, such as "A," such a reference character refers to a particular element from the group of elements. For example, as used herein and in the drawings, the reference character "108" refers to all the user interfaces (e.g., 108A-D) designated at least in part with reference numeral "108" and the reference character "108A" refers to a specific one of the user interfaces such as the user interface associated with a specific receiver 20A.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

The programs and other executable program components, such as the operating system, may be considered as discrete blocks. It is recognized, however, that such programs and components reside at various times in different storage components of a computing device, and are executed by a data processor(s) of the device.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of receiver-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

Other Statements of the Disclosure

The following are statements of example embodiments described in the present disclosure. Although some of the following statements are not currently presented as claims, the statements are believed to be patentable and may subsequently be presented as claims. Associated methods corresponding to the statements or apparatus or systems below, are also believed to be patentable and may subsequently be presented as claims. It is understood that the following statements may refer to and be supported by one, more than one or all of the embodiments described above.

A1. A food holding apparatus comprising: a housing including an upper portion having one or more food receivers, each food receiver defining a cavity with an open top, the cavity being sized and shaped to receive a tray of food when the tray of food is inserted into the cavity from the open top, each food receiver having a cooling conduit configured to receive refrigerant to cool the tray of food when the tray of food is disposed in the cavity; a support movable relative to the housing between a stored position and an access position; and a refrigeration system fluidly coupled to the cooling conduit to supply the cooling conduit with the refrigerant, the refrigeration system including: a compressor; a condenser; and plumbing fluidly connecting the compressor, condenser and the cooling conduit; wherein at least one of the compressor and condenser is supported by the support and is movable with the support between the stored and access positions.

A2. The food holding apparatus of statement A1, wherein the housing defines an interior, wherein the support is disposed in the interior when support is in the stored position and wherein the support is at least partially disposed outside of the interior when the support is in the access position.

A3. The food holding apparatus of statement A2, wherein the housing defines an opening in communication with the interior, wherein the support is configured to move in the opening when the support is moved toward the stored and access positions.

A4. The food holding apparatus of statement A3, wherein the compressor and condenser are disposed in the interior when the support is in the stored position.

A5. The food holding apparatus of statement A4, wherein at least one of the condenser or the compressor is disposed outside of the interior when the support is in the access position.

A6. The food holding apparatus of statement A5, wherein the condenser is disposed outside of the interior when the support is in the access position.

A7. The food holding apparatus of statement A4, wherein both the compressor and condenser are supported by the support and are movable with the support between the stored and access positions.

A8. The food holding apparatus of statement A7, wherein both the compressor and condenser are disposed outside of the interior when the support is in the access position.

A9. The food holding apparatus of statement A4, wherein the compressor is closer to a rear wall of the housing when the support is in the stored position than when the support is in the access position.

A10. The food holding apparatus of statement A1, wherein the plumbing includes at least one connector, the at least one connector configured to permit the at least one of the condenser or compressor to move between the stored and access positions while remaining attached to the plumbing.

A11. The food holding apparatus of statement A10, wherein the connector comprises a flexible pipe.

A12. The food holding apparatus of statement A11, wherein the connector comprises a coiled flexible pipe.

A13. The food holding apparatus of statement A12, wherein the coiled flexible pipe forms a plurality of hoops, wherein the hoops are closer together relative to one another when the support is in the stored position than when the support is in the access position.

A14. The food holding apparatus of statement A10, wherein both the compressor and condenser are supported by the support and are movable with the support between the stored and access positions, wherein the at least one connector includes a first connector disposed between the compressor and the cooling conduit and a second connector disposed between the condenser and the cooling conduit to permit both the condenser and compressor to move between the stored and access positions while remaining attached to the plumbing.

A15. The food holding apparatus of statement A1, further comprising at least one holder configured to hold the support in the stored position when the support is moved from the access position toward the stored position.

A16. The food holding apparatus of statement A15, wherein the at least one holder includes a tapered surface configured to engage the support when the support is moved toward the stored position to position the support in the stored position.

A17. The food holding apparatus of statement A15, wherein the at least one holder includes a first holder and a second holder.

A18. The food holding apparatus of statement A1, further comprising one or more rails defining a track along which the support is movable between the stored and access positions.

A19. The food holding apparatus of statement A1, wherein each food receiver includes a heater configured to heat the tray of food when the tray of food is disposed in the cavity.

A20. The food holding apparatus of statement A19, further comprising a temperature controller configured to operate the refrigeration system and each heater of the one or more food receivers to selectively cool or heat each food receiver.

A21. The food holding apparatus of statement A20, wherein the one or more food receivers comprises a plurality of food receivers.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A food holding apparatus comprising:
   a housing defining an interior, the housing including an upper portion having a food receiver, the food receiver defining a cavity with an open top, the cavity being sized and shaped to receive a first tray of food when the tray of food is inserted into the cavity from the open top, the food receiver having a cooling conduit configured to receive refrigerant to cool the tray of food when the tray of food is disposed in the cavity;
   a track in the interior of the housing and supported by the housing;
   a support movable relative to the housing along the track between a stored position and an access position, the support being configured to be disposed in the interior of the housing when the support is in the stored position, the support being configured to be at least partially outside the interior in a cantilevered arrangement when the support is in the access position; and a refrigeration system fluidly coupled to the cooling conduit to supply the cooling conduit with refrigerant, the refrigeration system including:
  a compressor;
  a condenser; and
  plumbing fluidly connecting the compressor, the condenser, and the cooling conduit;
wherein at least one of the compressor or the condenser is supported by the support and is movable with the support between the stored and access positions;
wherein the housing defines an opening in communication with the interior, and wherein the support is configured to move in the opening when the support is moved from the stored position toward the access position, the opening being different from the track;
wherein the track is configured to guide movement of the support in a first direction away from the stored position toward the access position and to guide movement of the support in a second direction away from the access position toward the stored position, and the track is configured to support the support against tipping in the first direction when the support is in the access position to locate and support said at least one of compressor or the condenser for access in the access position;
wherein the compressor and the condenser are configured to be disposed in the interior when the support is in the stored position;
wherein the plumbing includes a connector, the connector configured to permit the at least one of the condenser or the compressor to move between the stored and access positions while remaining attached to the plumbing.

2. The food holding apparatus of claim 1, wherein at least one of the condenser or the compressor is configured to be disposed outside of the interior when the support is in the access position.

3. The food holding apparatus of claim 2, wherein the condenser is configured to be disposed outside of the interior when the support is in the access position.

4. The food holding apparatus of claim 1, wherein the compressor and the condenser are configured to be disposed outside of the interior when the support is in the access position.

5. The food holding apparatus of claim 1, wherein the compressor and the condenser are supported by the support and are movable with the support between the stored and access positions.

6. The food holding apparatus of claim 1, wherein the connector comprises a coiled flexible pipe.

7. The food holding apparatus of claim 1, wherein the connector is a first connector and the plumbing includes a second connector, wherein the compressor and the condenser are supported by the support and are movable with the support between the stored and access positions, and wherein the first connector is disposed between the compressor and the cooling conduit and the second connector is disposed between the condenser and the cooling conduit to permit both the condenser and compressor to move between the stored and access positions while remaining attached to the plumbing.

8. The food holding apparatus of claim 1, further comprising a holder arranged to engage the support when the support is in the stored position to hold the support in the stored position.

9. The food holding apparatus of claim 8, wherein the holder is configured to disengage from the support when the support is moved toward the access position and to engage the support when the support is moved toward the stored position.

10. The food holding apparatus of claim 9, wherein the track has a track axis, the support being configured to move parallel to the track axis between the stored position and the access position, the holder including an engagement surface arranged to engage the support when the support is moved toward the stored position to position the support in the stored position and to disengage the support when the support is moved toward the access position, the engagement surface being oriented at a skewed angle relative to the track axis.

11. The food holding apparatus of claim 1, wherein the food receiver includes a heater configured to heat the tray of food when the tray of food is disposed in the cavity.

12. The food holding apparatus of claim 11, further comprising a temperature controller configured to operate the refrigeration system and the heater to selectively cool or heat the food receiver.

13. The food holding apparatus of claim 12, wherein the food receiver is a first food receiver, the food holding apparatus further comprising a second food receiver, the second food receiver defining a cavity with an open top, the cavity of the second food receiver being sized and shaped to receive a second tray of food when the second tray of food is inserted into the cavity of the second food receiver from the open top of the second food receiver, the second food receiver having a cooling conduit configured to receive refrigerant to cool the second tray of food when the second tray of food is disposed in the cavity of the second food receiver, the second food receiver including a heater configured to heat the second tray of food when the second tray of food is disposed in the cavity of the second food receiver, the temperature controller configured to operate the refrigeration system and the heater of the second food receiver to selectively cool or heat the second food receiver independent of the first food receiver.

14. The food holding apparatus of claim 1, wherein the track includes a rail, the support being movable along the rail between the stored position and the access position, the support being arranged to engage the rail to inhibit the support from tipping in the first direction when the support is in the access position.

15. The food holding apparatus of claim 14, wherein the rail is mounted to and extends upward from a base of the housing.

16. The food holding apparatus of claim 1, wherein the support is in engagement with and slidable on the track as the support is moved from the stored position to the access position.

17. The food holding apparatus of claim 1, further comprising a holder arranged relative to the support to hold the support in the stored position, the holder including a ramp configured to frictionally engage the support as the support is moved toward the stored position.

18. The food holding apparatus of claim 17, wherein the ramp is configured to increase frictional force on the support as the support is moved along the ramp toward the stored position.

19. The food holding apparatus of claim 1, further comprising a holder arranged relative to the track to engage the support when the support is moved from the access position toward the stored position and to limit rattling of the support in the stored position by engagement of the holder with the support, the holder being arranged to disengage from the support when the support is moved away from the stored position toward the access position.

20. The food holding apparatus of claim 1, further comprising a first engagement surface and a second engagement surface, the first and second engagement surfaces arranged relative to the support such that the first and second engagement surfaces squeeze the support between the first and second engagement surfaces as the support is moved toward the stored position.

21. The food holding apparatus of claim 1, further comprising an engagement surface arranged relative to the support such that the engagement surface squeezes the support between the engagement surface and the track as the support is moved toward the stored position.

22. The food holding apparatus of claim 1, wherein a majority of the support is disposed outside the interior of the housing when the support is in the access position.

\* \* \* \* \*